US012676163B2

(12) United States Patent
Zhang et al.

(10) Patent No.: US 12,676,163 B2
(45) Date of Patent: Jul. 7, 2026

(54) SOUND SIGNAL PROCESSING METHOD AND APPARATUS, AND COMPUTER-READABLE STORAGE MEDIUM

(71) Applicant: HUAWEI TECHNOLOGIES CO., LTD., Shenzhen (CN)

(72) Inventors: Lei Zhang, Dongguan (CN); Zhihui Liu, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 201 days.

(21) Appl. No.: 18/540,772

(22) Filed: Dec. 14, 2023

(65) Prior Publication Data

US 2024/0185876 A1     Jun. 6, 2024

Related U.S. Application Data

(63) Continuation of application No. PCT/CN2022/078673, filed on Mar. 1, 2022.

(30) Foreign Application Priority Data

Jun. 15, 2021     (CN) .......................... 202110662840.4
Aug. 19, 2021     (CN) .......................... 202110957047.7

(51) Int. Cl.
*G10L 21/028*          (2013.01)
*G06T 7/50*          (2017.01)
(Continued)

(52) U.S. Cl.
CPC .............. *G10L 21/028* (2013.01); *G06T 7/50* (2017.01); *G06V 40/169* (2022.01); *G10L 15/22* (2013.01); *G10L 2021/02166* (2013.01)

(58) Field of Classification Search
CPC .................. G10L 21/028; G10L 15/22; G10L 2021/02166; G10L 17/00; G10L 21/02;
(Continued)

(56) References Cited

U.S. PATENT DOCUMENTS 10,504,516 B2 * 12/2019 Barth ...................... G10L 15/22
11,158,335 B1 * 10/2021 Ganguly ................. G10L 15/22
(Continued)

FOREIGN PATENT DOCUMENTS

CN          110875056 A          3/2020
CN          111624553 A          9/2020
(Continued)

*Primary Examiner* — Abul K Azad

(57)          ABSTRACT

The present disclosure discloses a sound signal processing method and apparatus, and a computer-readable storage medium, and belongs to the field of audio processing technologies. A device first obtains first spatial location information of sound pickup space and second spatial location information of a plurality of microphones deployed non-linearly, and then determines, based on first sound signals respectively received by the plurality of microphones and the second spatial location information, a spatial location of a first sound source that emits the first sound signals. If the first sound source is located in the sound pickup space, the device performs enhancement processing on the sound signals emitted by the first sound source. In the present disclosure, sound sources in different space are distinguished, so that only a sound signal emitted by a sound source located in the sound pickup space is enhanced.

18 Claims, 14 Drawing Sheets

(51) Int. Cl.
  *G06V 40/16*     (2022.01)
  *G10L 15/22*     (2006.01)
  *G10L 21/0216*    (2013.01)

(58) Field of Classification Search
  CPC ....... G10L 21/0216; G10L 25/51; G06T 7/50;
        G06V 40/169; H04M 3/568; H04M
         2203/509; H04R 2201/401; H04R
         2201/403; H04R 2201/405; H04R
         2430/20; H04R 3/005; H04R 1/406
  See application file for complete search history.

(56)        References Cited

U.S. PATENT DOCUMENTS

| | | | |
|---|---|---|---|
| 2017/0098453 A1* | 4/2017 | Wright | .................... H04S 1/002 |
| 2018/0190266 A1* | 7/2018 | Sun | .................... G10L 15/1815 |
| 2018/0190282 A1* | 7/2018 | Mohammad | ........... G10L 15/20 |
| 2019/0364359 A1* | 11/2019 | Ferguson | ............. A61K 9/5031 |
| 2021/0168517 A1 | 6/2021 | Wexler et al. | |
| 2025/0220378 A1* | 7/2025 | Sharma | .................... H04S 7/30 |

FOREIGN PATENT DOCUMENTS

| | | |
|---|---|---|
| CN | 213028518 U | 4/2021 |
| CN | 113203988 A | 8/2021 |
| JP | 2017168903 A | 9/2017 |

* cited by examiner

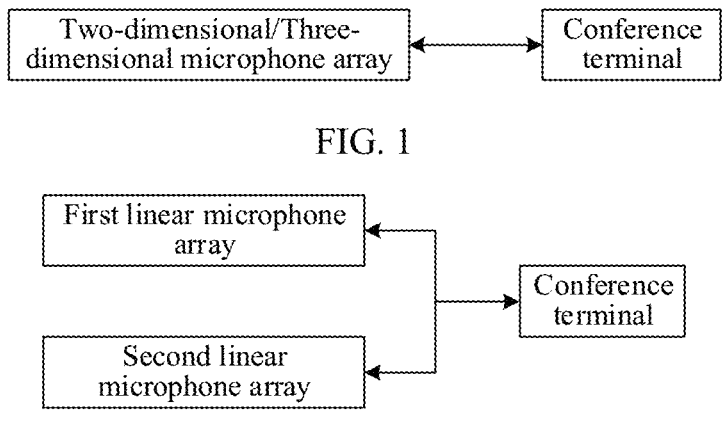
FIG. 1
FIG. 2
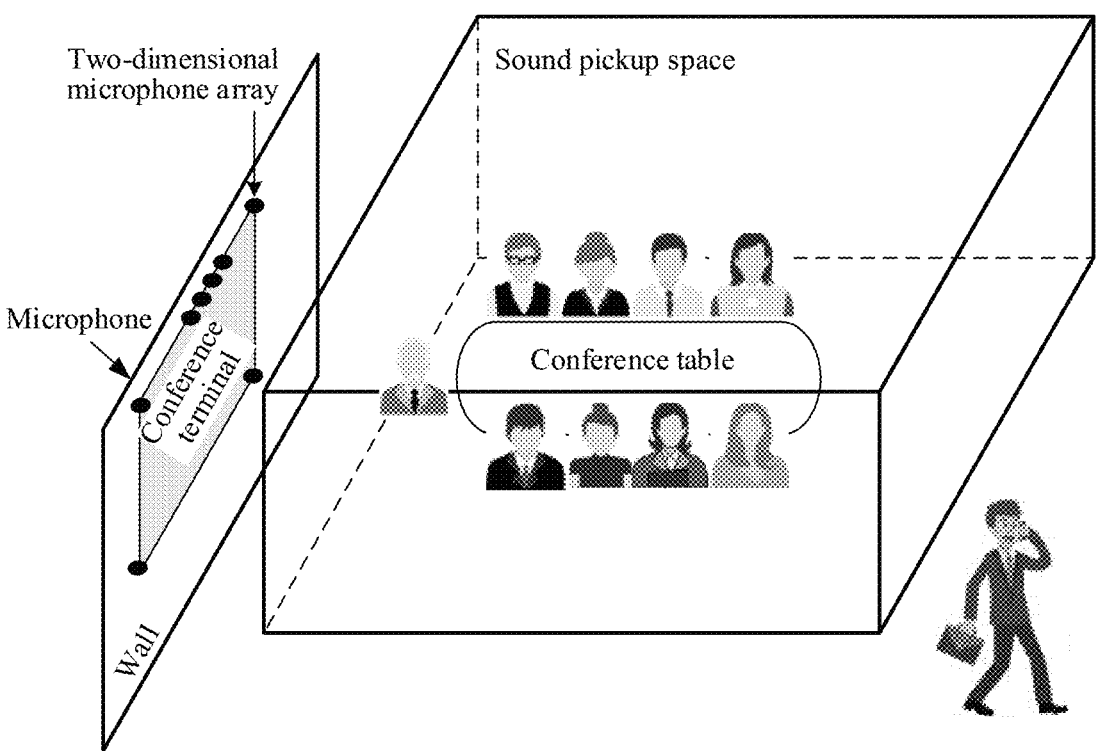
FIG. 3

Microphone

Search space

Location of a
hypothetical
sound source $Z$ $(x_2, y_2, z_2)$     $(x_3$ to $x_8, y_3$ to $y_8, z_3$ to $z_8)$     $(x_9, y_9, z_9)$ $d_2$     $d_3$ to $d_8$     $d_9$ $(x_0, y_0, z_0)$     $(x_1, y_1, z_1)$     $X$ $d_{ref}$     $d_1$ $Y$     Sound
source
$(x, y, z)$

SOUND SIGNAL PROCESSING METHOD AND APPARATUS, AND COMPUTER-READABLE STORAGE MEDIUM

CROSS-REFERENCE TO RELATED APPLICATIONS

This application is a continuation of International Application No. PCT/CN2022/078673, filed on Mar. 1, 2022, which claims priority to Chinese Patent Application No. 202110662840.4, filed on Jun. 15, 2021 and Chinese Patent Application No. 202110957047.7, filed on Aug. 19, 2021. All of the aforementioned patent applications are hereby incorporated by reference in their entireties.

TECHNICAL FIELD

The present disclosure relates to the field of audio processing technologies, and in particular, to an audio signal processing method and apparatus, and a computer-readable storage medium.

BACKGROUND

In a conference scenario, when a conference terminal is deployed in an open area or in an environment without acoustic design, external disturbing noise is picked up by a conference microphone, and transmitted to a remote end via the conference terminal. As a result, the disturbing noise is heard by another conference participant, and conference quality is affected. Therefore, how to process only a desired sound signal in a conference area and to suppress the disturbing noise outside the conference area is a key to improving the conference quality.

SUMMARY

The present disclosure provides a sound signal processing method and apparatus, and a computer-readable storage medium.

According to a first aspect, a sound signal (i.e., an audio signal) processing method is provided. The method is performed by a sound signal processing device or a device that has a sound signal processing function and that is connected to the sound signal processing device. The sound signal processing device may be, for example, a conference terminal. The method includes: obtaining first spatial location information of sound pickup space and second spatial location information of a plurality of microphones, where the plurality of microphones are deployed non-linearly, and distances from the plurality of microphones to a specified location in the sound pickup space are not completely the same; determining, based on first sound signals respectively received by the plurality of microphones and the second spatial location information, a spatial location of a first sound source that emits the first sound signals; and if it is determined, based on the first spatial location information and the spatial location of the first sound source, that the first sound source is located in the sound pickup space, performing enhancement processing on the sound signals emitted by the first sound source.

In the present disclosure, the spatial location of the sound source can be determined based on the sound signals respectively received by the plurality of microphones and the spatial location information of the plurality of microphones. With reference to the spatial location information of the preconfigured sound pickup space, whether the sound source is located in the sound pickup space or outside the sound pickup space can be further determined. In addition, enhancement processing is performed only on the sound signals emitted by the sound source located in the sound pickup space. When the solution is applied to a conference scenario, sound sources in different space can be effectively distinguished, and sound in the sound pickup space can be enhanced, to improve a conference sound pickup effect.

Optionally, the first sound signal is a human sound signal. That is, the first sound source is a human sound source.

Optionally, the foregoing method further includes: determining, based on second sound signals respectively received by the plurality of microphones and the second spatial location information, a spatial location of a second sound source that emits the second sound signals, where the second sound signal is a non-human sound signal; if the second sound source is located in the sound pickup space, determining first mute space based on the spatial location of the second sound source, where the second sound source is located in the first mute space; and eliminating the first mute space from the sound pickup space.

For example, when the foregoing solution is applied to the conference scenario, all sound (for example, keyboard sound, air-conditioner sound, and computer-fan sound) other than human sound may be considered as noise. Noise signals from the sound pickup space are identified, spatial positioning is performed on a noise source that emits the noise signals, and then a location of the noise source is eliminated from the sound pickup space, to implement adaptive adjustment of the sound pickup space, thereby suppressing the noise in the preset sound pickup space and improving the conference sound pickup effect.

Optionally, the foregoing method further includes: receiving a first control command from a target user, where the first control command instructs to suppress sound of the target user; determining second mute space based on the first control command, where a sound source of the target user is located in the second mute space; and eliminating the second mute space from the sound pickup space.

In the present disclosure, a range of the sound pickup space may be flexibly adjusted based on the control instruction sent by the user, to suppress sound of a single user located in the preset sound pickup space, so that the single user can be muted in a conference process, and sound pickup flexibility is improved. The noise in the preset sound pickup space can be better suppressed through elaborate control of the sound pickup space.

During specific implementation, the user may send the first control command in a plurality of flexible and expedient manners.

In a first possible implementation, the first control command is a voice control command, and the implementation of the receiving a first control command from a target user includes: receiving first control instructions by using the plurality of microphones; and the implementation of the determining second mute space based on the first control command includes: determining a spatial location of the sound source of the target user based on the first control commands respectively received by the plurality of microphones and the second spatial location information; and if the spatial location of the sound source of the target user is located in the sound pickup space, determining the second mute space based on the spatial location of the sound source of the target user.

In a second possible implementation, the first control command is a body control command, and the implementation of the receiving a first control command from a target user includes: receiving the first control instruction based on an image captured by a target camera, where the image includes imaging of the target user, and the image is a depth image; and the implementation of the determining second mute space based on the first control command includes: determining spatial location information of the target user based on information about a location of the imaging of the target user in the image and spatial location information of the target camera; and if the target user is located in the sound pickup space, determining the second mute space based on the spatial location information of the target user, where the target user is located in the second mute space.

In a third possible implementation, the first control command is a body control command, and the implementation of the receiving a first control command from a target user includes: receiving the first control instruction based on an image captured by a target camera, where the image includes imaging of the target user, and the image is a two-dimensional image; and the implementation of the determining second mute space based on the first control command includes: determining information about a horizontal angle of the target user relative to the target camera based on a correspondence between information about a location of the imaging of the target user in the image and a horizontal field of view of the target camera; and determining the second mute space based on the information about the horizontal angle of the target user relative to the target camera, where the target user is located in the second mute space.

Optionally, after the determining second mute space, the foregoing method further includes: storing a correspondence between user information of the target user and spatial location information of the second mute space.

Optionally, when the first control command is the voice control command, the user information in the stored correspondence includes a voiceprint of the target user; or when the first control command is the body control command, the user information in the stored correspondence includes a facial feature of the target user.

Further, the foregoing method further includes: receiving a second control command from the target user, where the second control command instructs to cancel the suppression of the sound of the target user; obtaining spatial location information of the second mute space based on user information of the target user and a stored correspondence between the user information of the target user and the spatial location information of the second mute space; and adding the second mute space to the sound pickup space based on the spatial location information of the second mute space.

In the present disclosure, the range of the sound pickup space may be flexibly adjusted based on the control instruction sent by the user, to cancel the suppression of the sound of the single user located in the preset sound pickup space, so that the single user can be unmuted in the conference process, and the sound pickup flexibility is improved.

Optionally, the plurality of microphones form a two-dimensional microphone array or a three-dimensional microphone array.

Optionally, a first implementation of the determining, based on first sound signals respectively received by the plurality of microphones and the second spatial location information, a spatial location of a first sound source that emits the first sound signals includes: determining a difference between delays of first sound signals from the first sound source to a first microphone and a second microphone based on a spectrogram of a first sound signal received by the first microphone and a spectrogram conjugation of a first sound signal received by the second microphone, where the first microphone and the second microphone are different microphones in the plurality of microphones; determining a difference between a distance from the first sound source to the first microphone and a distance from the first sound source to the second microphone based on the difference between the delays of the first sound signals from the first sound source to the first microphone and the second microphone; and determining the spatial location of the first sound source based on differences between distances from the first sound source to a plurality of pairs of microphones in the plurality of microphones and the second spatial location information of the plurality of microphones.

Optionally, a second implementation of the determining, based on first sound signals respectively received by the plurality of microphones and the second spatial location information, a spatial location of a first sound source that emits the first sound signals includes: searching in a search range by using a steered-response power phase transform (steered-response power phase transform, SRP-PHAT) algorithm based on the first sound signals respectively received by the plurality of microphones and the second spatial location information of the plurality of microphones, to determine the spatial location of the first sound source, where the search range includes the sound pickup space.

Optionally, the plurality of microphones include a linear microphone array, and a third implementation of the determining, based on first sound signals respectively received by the plurality of microphones and the second spatial location information, a spatial location of a first sound source that emits the first sound signals includes: determining an azimuth of the first sound source relative to the linear microphone array based on first sound signals received by the linear microphone array; determining a search plane based on the azimuth of the first sound source relative to the linear microphone array and spatial location information of each microphone in the linear microphone array, where the first sound source is located on the search plane, and an angle between the search plane and a straight line on which the linear microphone array is located is equal to the azimuth of the first sound source relative to the linear microphone array; and searching in a search range by using an SRP-PHAT algorithm, to determine the spatial location of the first sound source, where the search range includes an intersecting plane of the search plane and the sound pickup space.

In this implementation, the azimuth of the sound source relative to the linear microphone array is first determined by using the linear microphone array, the search plane is determined based on the azimuth of the sound source relative to the linear microphone array, and then the search range is determined with reference to the search plane and the sound pickup space. In this way, the determined search range is small. A space search volume can be reduced to a large extent in comparison with that in the foregoing second implementation. This can save a computing resource, and improve sound source positioning efficiency.

Optionally, the plurality of microphones include a first linear microphone array and a second linear microphone array, and a fourth implementation of the determining, based on first sound signals respectively received by the plurality of microphones and the second spatial location information, a spatial location of a first sound source that emits the first sound signals includes: determining an azimuth of the first sound source relative to the first linear microphone array based on first sound signals received by the first linear microphone array; determining a first search plane based on the azimuth of the first sound source relative to the first linear microphone array and spatial location information of each microphone in the first linear microphone array, where the first sound source is located on the first search plane, and an angle between the first search plane and a straight line on which the first linear microphone array is located is equal to the azimuth of the first sound source relative to the first linear microphone array; determining an azimuth of the first sound source relative to the second linear microphone array based on first sound signals received by the second linear microphone array; determining a second search plane based on the azimuth of the first sound source relative to the second linear microphone array and spatial location information of each microphone in the second linear microphone array, where the first sound source is located on the second search plane, and an angle between the second search plane and a straight line on which the second linear microphone array is located is equal to the azimuth of the first sound source relative to the second linear microphone array; determining a search range based on a location of an intersecting line of the first search plane and the second search plane, where the first search plane and the second search plane are not coplanar; and searching in the search range by using an SRP-PHAT algorithm, to determine the spatial location of the first sound source.

In this implementation, the azimuth of the sound source relative to each linear microphone array is determined by using the two linear microphone arrays separately, one search plane is determined based on the azimuth of the sound source relative to one linear microphone array, and then the search range is determined based on the location of the intersecting line of the two search planes. In this way, the determined search range is small. A space search volume can be reduced to a large extent in comparison with that in the foregoing second implementation and that in the foregoing third implementation. This can save a computing resource, and improve sound source positioning efficiency.

According to a second aspect, a sound signal processing apparatus is provided. The apparatus includes a plurality of functional modules. The plurality of functional modules interact with each other to implement the method in the first aspect and the implementations of the first aspect. The plurality of functional modules may be implemented based on software, hardware, or a combination of the software and the hardware, and the plurality of functional modules may be randomly combined or divided based on specific implementation.

According to a third aspect, a sound signal processing device is provided, and includes a processor and a memory.

The memory is configured to store a computer program, and the computer program includes program instructions.

The processor is configured to invoke the computer program to implement the method in the first aspect and the implementations of the first aspect.

Optionally, the sound signal processing device further includes a plurality of microphones, the plurality of microphones are deployed non-linearly, distances from the plurality of microphones to a specified location in sound pickup space are not completely the same, and the plurality of microphones are configured to collect sound signals.

According to a fourth aspect, a computer-readable storage medium is provided. The computer-readable storage medium stores instructions. When the instructions are executed by a processor, the method in the first aspect and the implementations of the first aspect is implemented.

According to a fifth aspect, a chip is provided. The chip includes a programmable logic circuit and/or program instructions. When the chip runs, the method in the first aspect and the implementations of the first aspect is implemented.

BRIEF DESCRIPTION OF DRAWINGS

FIG. 1 is a schematic diagram of an architecture of a conference system according to an embodiment of the present disclosure;

FIG. 2 is a schematic diagram of an architecture of another conference system according to an embodiment of the present disclosure;

FIG. 3 is a schematic diagram of deployment of a conference system according to an embodiment of the present disclosure;

DESCRIPTION OF EMBODIMENTS

Figure 4:
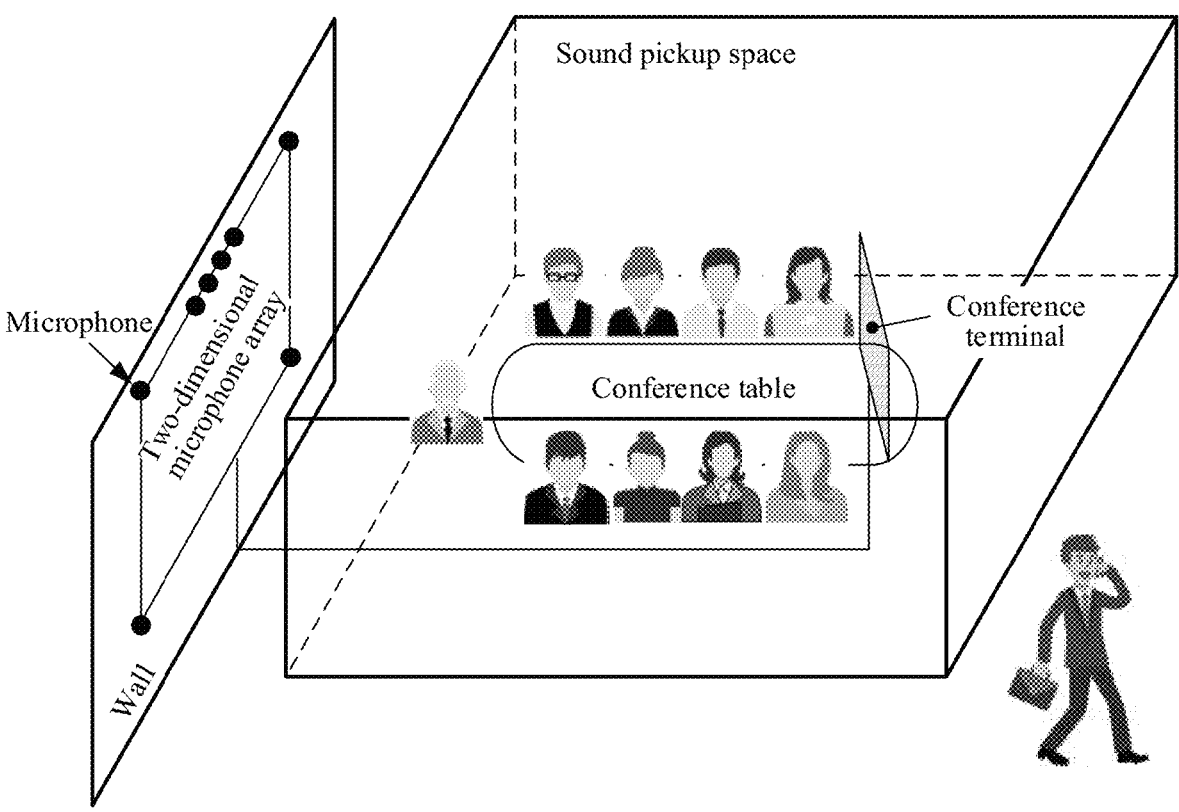
FIG. 4 is a schematic diagram of deployment of another conference system according to an embodiment of the present disclosure.

To make the objectives, technical solutions, and advantages of the present disclosure clearer, the following further describes the implementations of the present disclosure in detail with reference to the accompanying drawings.

A sound signal processing method provided in embodiments of the present disclosure is applied to a sound signal processing device. A plurality of microphones are built in the sound signal processing device, or the sound signal processing device is connected to a plurality of external microphones. The plurality of microphones are deployed nonlinearly, and distances from the plurality of microphones to a specified location in sound pickup space are not completely the same. The specified location may be a location at which there may be a sound source in the sound pickup space, or the specified location may be any location in the sound pickup space. When deployment locations of the plurality of microphones are designed or the plurality of microphones are actually deployed, a sound pickup scenario in which the plurality of microphones may be used may be considered, so that distances from the plurality of microphones to the location at which there may be a sound source in the sound pickup space are not completely the same, and spatial positioning of the sound source can be implemented based on the plurality of microphones.

The microphone is configured to pick up a sound signal. The sound signal processing device is configured to process the sound signal picked up by the microphone. There are diversified forms of the sound signal processing device. For example, the sound signal processing device may be a smart speaker or a conference terminal. In embodiments of the present disclosure, the solutions in the present disclosure are described by using an example in which the sound signal processing device is the conference terminal. Optionally, the conference terminal may be a large screen, an electronic whiteboard, a mobile phone, a tablet computer, or the like. The conference terminal is applied to a video conference, a voice conference, or the like, and can implement cross-region collaboration between a plurality of conference participants.

The sound pickup space is a preconfigured three-dimensional sound pickup area. The sound pickup space may be closed space. That is, a size of the sound pickup space is limited. For example, the sound pickup space may be a cuboid, and the size of the sound pickup space may be represented by using the length, the width, and the height. For another example, the sound pickup space may be a sphere, and the size of the sound pickup space may be represented by using the sphere diameter. Alternatively, the sound pickup space may be open space. For example, the height of the sound pickup space is not limited. In this case, provided that a horizontal location of the sound source is in a horizontal range of the sound pickup space, regardless of the height of the sound source, it is determined that the sound source is located in the sound pickup space. The size and a shape of the sound pickup space may be set based on a sound pickup requirement or a sound pickup scenario. Neither of the size and the shape of the sound pickup space are limited in embodiments of the present disclosure.

Optionally, the plurality of microphones form a two-dimensional microphone array or a three-dimensional microphone array (two-dimensional/three-dimensional microphone array for short). The microphone array is an array structure obtained by arranging the plurality of microphones based on a spatial structure. The microphone array can collect and process sound signals in different directions based on a spatial characteristic of the array structure. The two-dimensional microphone array is also referred to as a planar microphone array, and array element centers thereof are distributed on a plane. The three-dimensional microphone array is also referred to as a stereo microphone array, and array element centers thereof are distributed in stereo space.

Optionally, the plurality of microphones form a two-dimensional/three-dimensional microphone array of an integrated structure. For example, FIG. 1 is a schematic diagram of an architecture of a conference system according to an embodiment of the present disclosure. As shown in FIG. 1, the conference system includes a conference terminal and a two-dimensional/three-dimensional microphone array. Alternatively, the plurality of microphones includes a plurality of linear microphone arrays, and a two-dimensional/three-dimensional microphone array includes the plurality of linear microphone arrays. The linear microphone array is a one-dimensional microphone array, and array element centers thereof are located on a same straight line. For example, FIG. 2 is a schematic diagram of an architecture of another conference system according to an embodiment of the present disclosure.

As shown in FIG. 2, the conference system includes a conference terminal, a first linear microphone array, and a second linear microphone array. When the first linear microphone array and the second linear microphone array are located on a same plane, a two-dimensional microphone array includes the first linear microphone array and the second linear microphone array. When the first linear microphone array and the second linear microphone array are not on a same plane, for example, when the first linear microphone array and the second linear microphone array are deployed vertically relative to each other, a three-dimensional microphone array includes the first linear microphone array and the second linear microphone array. Certainly, the two-dimensional/three-dimensional microphone array may further include a linear microphone array other than the first linear microphone array and the second linear microphone array. It should be understood that the conference systems shown in FIG. 1 and FIG. 2 are merely used as examples for description, and are not for limiting a conference system to which the solutions in the present disclosure are applied.

Optionally, a microphone array and a conference terminal may be physically integrated as a device. In this case, the microphone array is built in the conference terminal. For example, a linear microphone array or a two-dimensional microphone may be built in the conference terminal. If the thickness of the conference terminal permits, a three-dimensional microphone array may be further built in the conference terminal. Alternatively, a microphone array and a conference terminal may be two physically separate devices. In this case, the conference terminal is connected to the external microphone array. For example, in the conference systems shown in FIG. 1 and FIG. 2, the conference terminal is connected to the external microphone array.

In embodiments of the present disclosure, descriptions are provided by using an example in which the two-dimensional microphone array includes the plurality of microphones. If the two-dimensional microphone array includes the plurality of microphones, there may be, for example, the following several deployment manners of the conference system: 1. The two-dimensional microphone array is built in the conference terminal. 2. The conference terminal is connected to the external two-dimensional microphone array. 3. One linear microphone array is built in the conference terminal, and the conference terminal is connected to the other external linear microphone array. 4. The conference terminal is connected to two external linear microphone arrays. In embodiments of the present disclosure, the four deployment manners of the conference system are schematically described by using FIG. 3 to FIG. 6.

FIG. 3 is a schematic diagram of deployment of a conference system according to an embodiment of the present disclosure. As shown in FIG. 3, a conference terminal is disposed on a wall, and a two-dimensional microphone array is built in the conference terminal. The two-dimensional microphone array is configured to collect sound signals. The conference system shown in FIG. 3 can be implemented by using only one conference terminal. This is convenient for deployment and use by a user, and is not easily affected by moving the conference terminal by the user, so that stability of the conference system is high.

FIG. 4 is a schematic diagram of deployment of another conference system according to an embodiment of the present disclosure. As shown in FIG. 4, a conference terminal is placed on a conference table, and the conference terminal is connected to an external two-dimensional microphone array. The two-dimensional microphone array is deployed on a wall. The two-dimensional microphone array is configured to collect sound signals.

Figure 5:
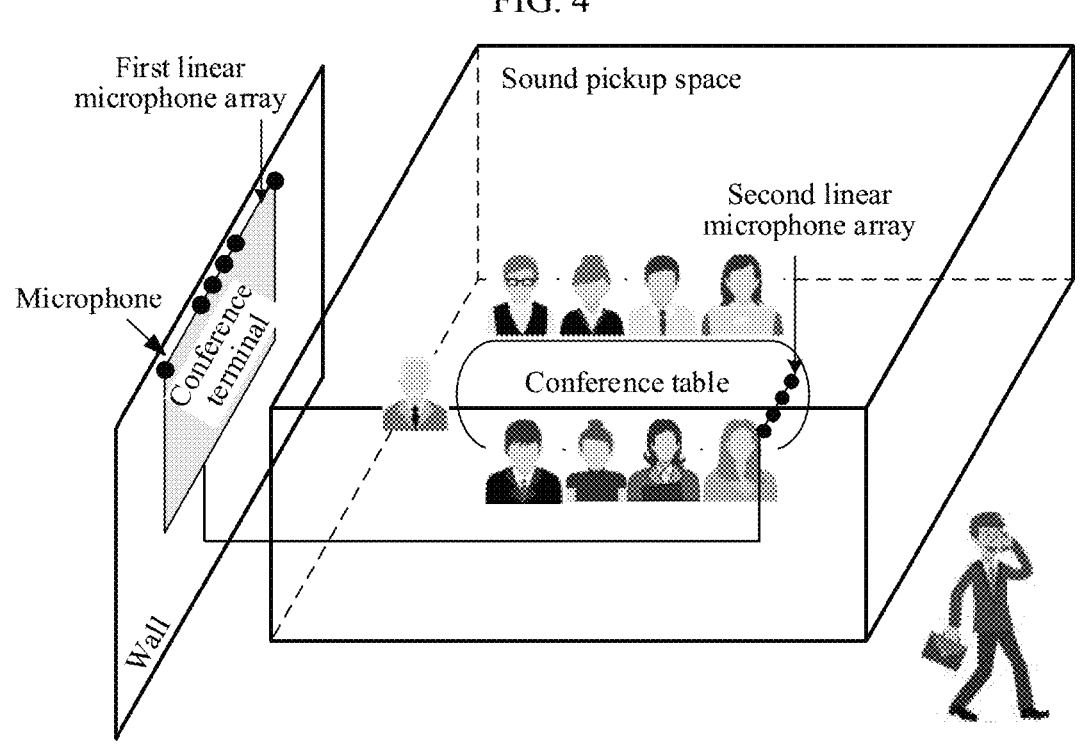
FIG. 5 is a schematic diagram of deployment of still another conference system according to an embodiment of the present disclosure.

FIG. 5 is a schematic diagram of deployment of still another conference system according to an embodiment of the present disclosure. As shown in FIG. 5, a conference terminal is disposed on a wall, a first linear microphone array is built in the conference terminal, and the conference terminal is connected to an external second linear microphone array. The second linear microphone array is located in sound pickup space, for example, placed on a conference table. The first linear microphone array and the second linear microphone array are separately configured to collect sound signals.

Figure 6:
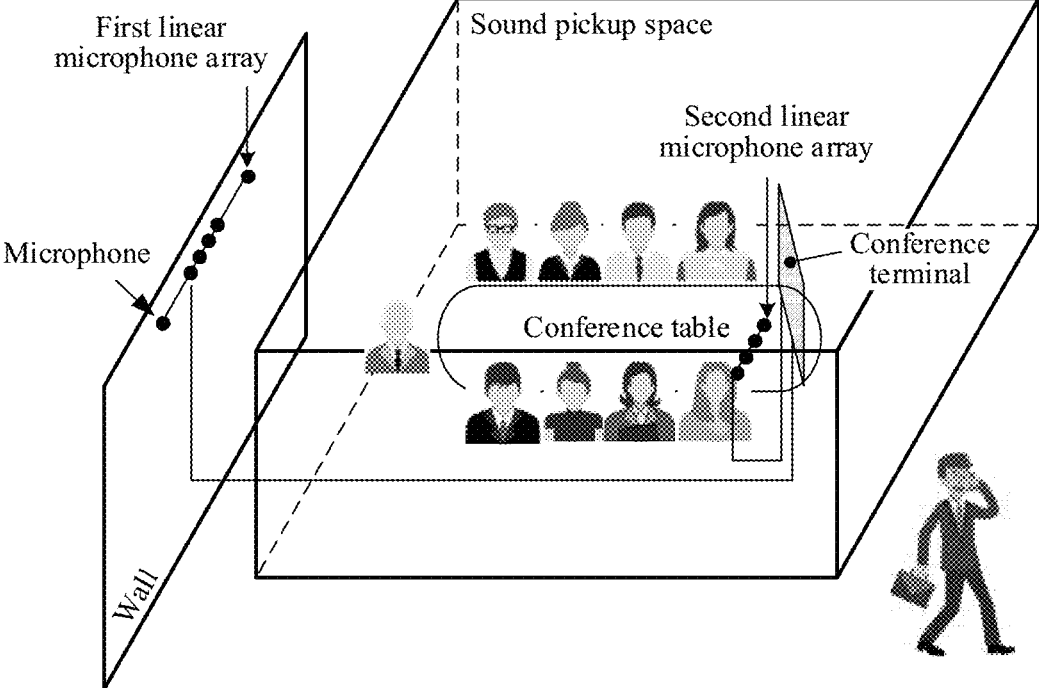
FIG. 6 is a schematic diagram of deployment of yet another conference system according to an embodiment of the present disclosure.

FIG. 6 is a schematic diagram of deployment of yet another conference system according to an embodiment of the present disclosure. As shown in FIG. 6, a conference terminal is placed on a conference table, and the conference terminal is connected to an external first linear microphone array and an external second linear microphone array. The first linear microphone array is deployed on a wall. The second linear microphone array is placed in sound pickup space, for example, on the conference table. The first linear microphone array and the second linear microphone array are separately configured to collect sound signals.

Optionally, if the three-dimensional microphone array includes the plurality of microphones, a deployment manner of the conference system may be, for example, as follows: A two-dimensional microphone array is built in the conference terminal, and the conference terminal is connected to an external linear microphone array. The three-dimensional microphone array includes the built-in two-dimensional microphone array and the external linear microphone array. Examples are not used one by one for description herein again in embodiments of the present disclosure.

Optionally, when the plurality of microphones are deployed, the plurality of microphones are evenly distributed in or around the sound pickup space as much as possible, so that the plurality of microphones can evenly pick up sound from a sound source located in the sound pickup space. For example, in a structure shown in any one of FIG. 3 to FIG. 6, the sound pickup space is a cuboid, and the plurality of microphones may be symmetrically deployed on two sides of a target vertical plane, where the target vertical plane is a vertical plane that passes through a center of the sound pickup space and is perpendicular to the wall.

The conference system provided in embodiments of the present disclosure is deployed in a conference scenario, and the sound pickup space is configured based on the conference scenario. A location of a conference spokesperson is usually considered when the sound pickup space is set. Correspondingly, the spokesperson is usually located in the specified sound pickup space as much as possible. Therefore, in a conference process, a local conference terminal distinguishes sound sources in different space, and performs enhancement processing only on a sound signal emitted by the sound source located in the sound pickup space, so that a conference sound pickup effect can be improved. Further, the local conference terminal encodes a sound signal on which enhancement processing is performed, and then sends an encoded sound signal to a remote conference terminal, so that the conference sound pickup effect can be improved.

In some optional embodiments, the local conference terminal may further perform suppression processing on a sound signal emitted by a sound source located outside the sound pickup space, and does not send the sound signal to the remote conference terminal, so that the sound signal (namely, noise) emitted by the sound source located outside the sound pickup space is suppressed, and the conference sound pickup effect can be further improved.

In some other optional embodiments, the sound pickup space is configured as the closed space. Noise may be suppressed in not only a horizontal direction but also a height direction. That is, all-round noise suppression is implemented, so that the conference sound pickup effect can be further improved.

The remote conference terminal is a conference terminal that participates in a same conference as the local conference terminal and that is deployed in a different area. Optionally, the local conference terminal is connected to the remote conference terminal via a multimedia control platform. The local conference terminal may send, to the multimedia control platform, the sound signal on which enhancement processing is performed, and the multimedia control platform performs audio mixing and encoding on the received sound signal, and then sends, to the remote conference terminal, a sound signal on which audio mixing and encoding are performed. Certainly, the conference terminal may alternatively be integrated with some or all functions of a multimedia control platform, and the local conference terminal may perform audio mixing and encoding on the sound signal on which enhancement processing is performed, and then directly send, to the remote conference terminal, a sound signal on which audio mixing and encoding are performed.

The following describes a method procedure in embodiments of the present disclosure by using an example.

Figure 7:
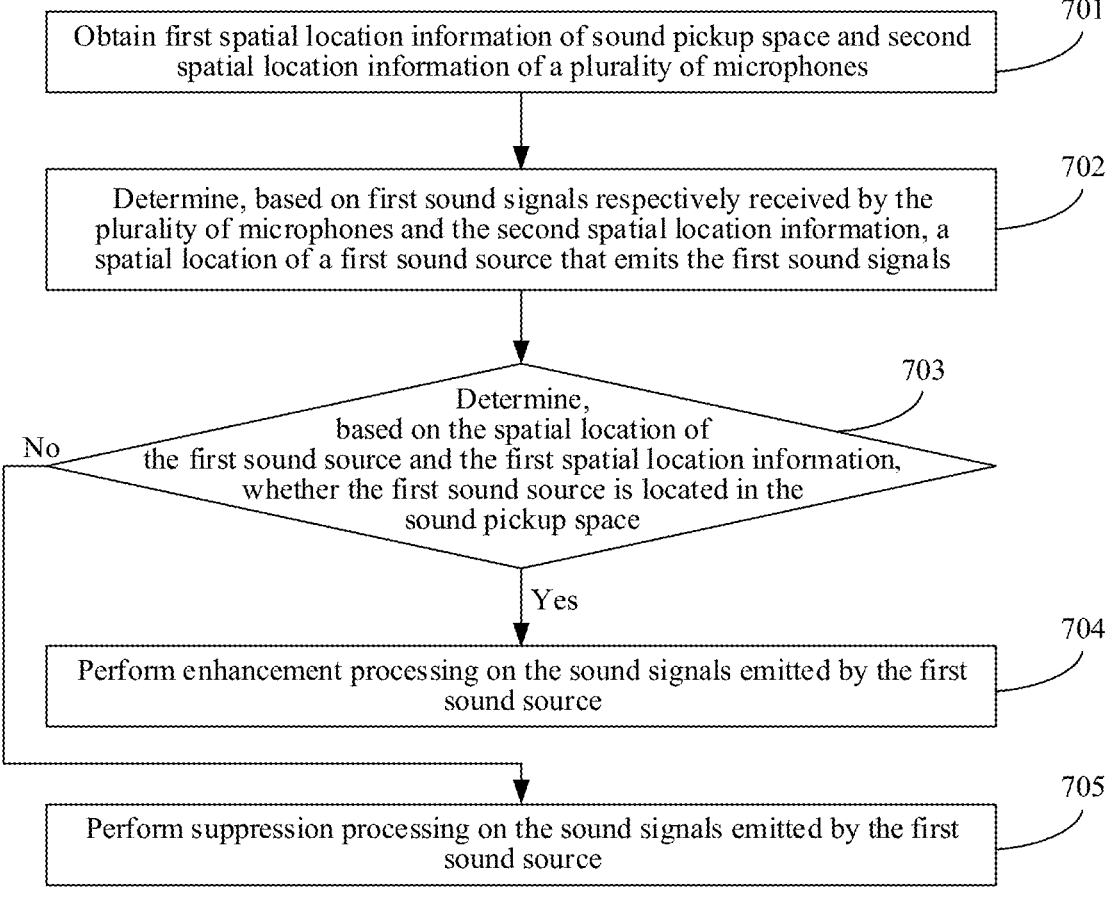
FIG. 7 is a schematic flowchart of a sound signal processing method according to an embodiment of the present disclosure.

FIG. 7 is a schematic flowchart of a sound signal processing method according to an embodiment of the present disclosure. The method may be applied to the conference terminal shown in any one of FIG. 1 to FIG. 6. As shown in FIG. 7, the method includes the following steps.

Step 701: Obtain first spatial location information of sound pickup space and second spatial location information of a plurality of microphones.

Conference control software is configured on the conference terminal, and the conference terminal receives configuration information of an administrator via the conference control software. For example, after the conference terminal is installed, the administrator may enter the configuration information through a settings interface of the conference terminal. The configuration information includes the spatial location information of the sound pickup space and the spatial location information of the plurality of microphones. This operation is usually performed when the conference terminal is used for the first time after the installation. If a range of the sound pickup space needs to be adjusted, the spatial location information of the sound pickup space may be reconfigured. If a location of the microphone changes, spatial location information of the microphone needs to be reconfigured.

Optionally, the spatial location information of the sound pickup space may be represented as a coordinate range of a point on a surface of the sound pickup space relative to a spatial reference point. The spatial location information of the microphone may be represented as coordinates of the microphone relative to the spatial reference point. Coordinates of a point in space relative to the spatial reference point are three-dimensional coordinates of the point in a spatial coordinate system established by using the spatial reference point as an origin. The spatial reference point may be any point in the space.

Figure 8:
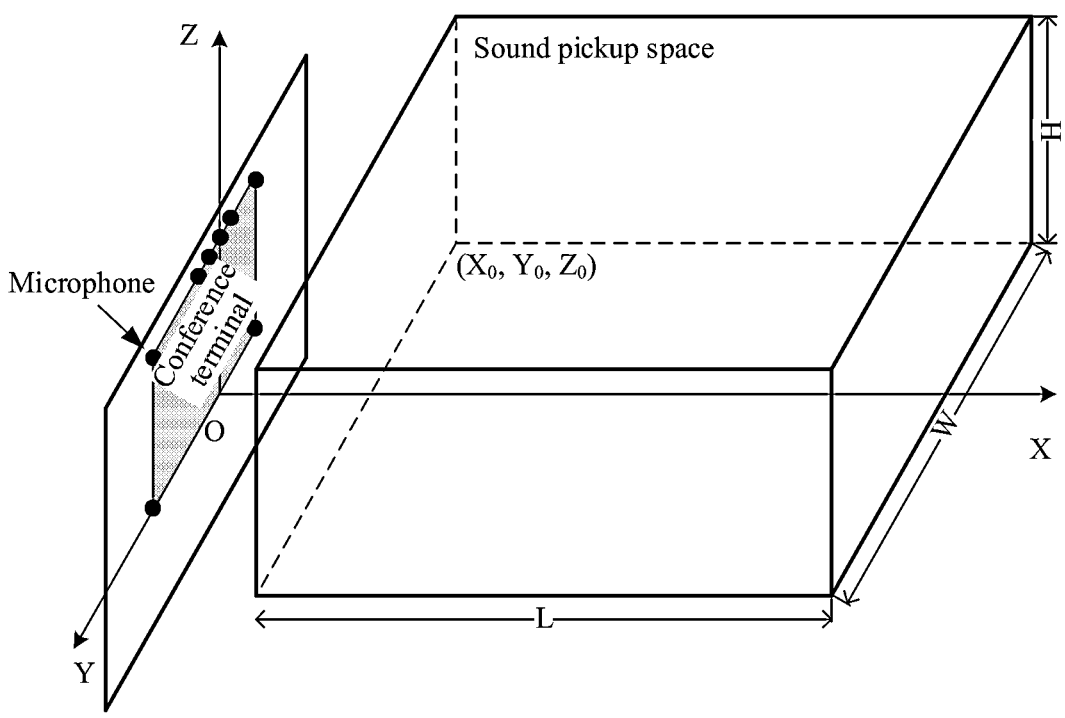
FIG. 8 is a schematic diagram of a setting of a spatial coordinate system, spatial location information of sound pickup space, and spatial location information of microphones according to an embodiment of the present disclosure.

For example, in the conference system shown in FIG. 3, a point on the conference terminal may be selected as the spatial reference point. FIG. 8 is a schematic diagram of a setting of a spatial coordinate system, spatial location information of sound pickup space, and spatial location information of microphones according to an embodiment of the present disclosure. As shown in FIG. 8, a spatial coordinate system X-Y-Z is established by using a spatial reference point O as an origin, where an X-axis and a Y-axis are located on a horizontal plane, and a Z-axis is perpendicular to the horizontal plane. Cuboid-shaped sound pickup space with a spatial coordinate range ($X_0$ to $X_0+L$, $Y_0$ to $Y_0+W$, $Z_0$ to $Z_0+H$) may be obtained by configuring the length of the sound pickup space to L, configuring the width of the sound pickup space to W, configuring the height of the sound pickup space to H, and configuring spatial coordinates of a vertex of the sound pickup space to ($X_0$, $Y_0$, $Z_0$). Spatial coordinates of M microphones are configured to ($x_m$, $y_m$, $z_m$), where $m=1, 2, \ldots,$ or M. m indicates an $m^{th}$ microphone. M indicates a quantity of the microphones, and a value of M is usually an integer greater than 3. For a microphone built in the conference terminal, the conference terminal usually stores information about a location of the microphone in the conference terminal. In this case, after determining the spatial reference point, the conference terminal may determine spatial coordinates of the microphone based on the information about the location of the microphone in the conference terminal, and manual configuration is not needed.

Step 702: Determine, based on first sound signals respectively received by the plurality of microphones and the second spatial location information, a spatial location of a first sound source that emits the first sound signals.

Optionally, there are a plurality of implementations of determining, based on the sound signals respectively received by the plurality of microphones and the spatial location information of the plurality of microphones, the spatial location of the sound source that emits the sound signals. In this embodiment of the present disclosure, the following four implementations are used as examples for description.

A first implementation may be applied to the conference system shown in any one of FIG. 3 to FIG. 6. An implementation process of step 702 includes step 7021A to step 7023A below.

In step 7021A, a difference between delays of first sound signals from the first sound source to a first microphone and a second microphone is determined based on a spectrogram of a first sound signal received by the first microphone and a spectrogram conjugation of a first sound signal received by the second microphone, where the first microphone and the second microphone are different microphones in the plurality of microphones.

Optionally, a difference between delays of sound signals from a same sound source to two microphones may be calculated by using a generalized cross correlation (generalized cross correlation, GCC) function method. A formula for calculating the difference between the delays based on the GCC function method is the following formula (1):

$$t_{12} = \underset{t}{\arg\max}\, R_{x_1 x_2}(t) \qquad \text{Formula (1)}$$

$t_{12}$ indicates the difference between the delays of the first sound signals from the first sound source to the first microphone and the second microphone. The formula (1) indicates that a value of $t_{12}$ is the parameter t that maximizes a value of the function $R_{x_1 x_2}(t)$. A calculation formula of the function $R_{x_1 x_2}(t)$ is the following formula (2):

$$R_{x_1 x_2}(t) = \int_{-\infty}^{\infty} \Psi_{12}(w) G_{x_1 x_2}(w) e^{jwt}\, dw \qquad \text{Formula (2)}$$

$\Psi_{12}(w)$ is a weighting function, and a value thereof may be 1. Alternatively, $\Psi_{12}(w)$ may be calculated by using a phase transform (phase transform, PHAT) weighting method, and a calculation formula is the following formula (3):

$$\Psi_{12}(w) = \frac{1}{\left| G_{x_1 x_2}(w) \right|} \qquad \text{Formula (3)}$$

$G_{x_1 x_2}(w)$ is a cross power density spectrum, and a calculation formula thereof is the following formula (4):

$$G_{x_1 x_2}(w) = X_1(w) \cdot X_2^*(w) \qquad \text{Formula (4)}$$

$X_1(w)$ is the spectrogram of the first sound signal received by the first microphone, and $$X_2^*(w)$$

is the spectrogram conjugation of the first sound signal received by the second microphone.

In step 7022A, a difference between a distance from the first sound source to the first microphone and a distance from the first sound source to the second microphone is determined based on the difference between the delays of the first sound signals from the first sound source to the first microphone and the second microphone.

The difference between the distance from the first sound source to the first microphone and the distance from the first sound source to the second microphone is equal to a product of a sound speed and the difference between the delays of the first sound signals from the first sound source to the first microphone and the second microphone.

In step 7023A, the spatial location of the first sound source is determined based on differences between distances from the first sound source to a plurality of pairs of microphones in the plurality of microphones and the second spatial location information of the plurality of microphones.

Figure 9:
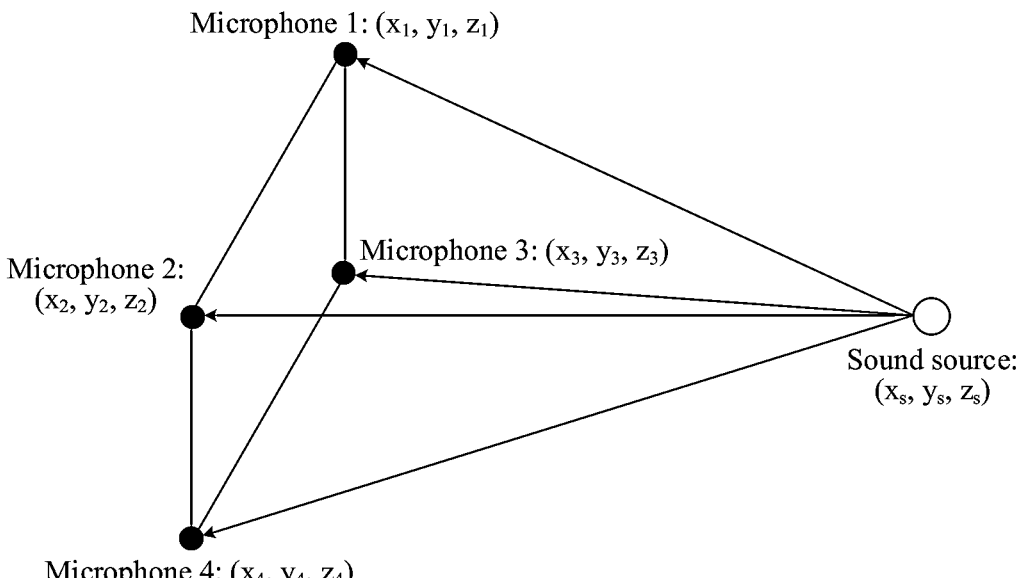
FIG. 9 is a schematic diagram of relative locations of a sound source and a plurality of microphones according to an embodiment of the present disclosure.

For example, FIG. 9 is a schematic diagram of relative locations of a sound source and a plurality of microphones according to an embodiment of the present disclosure. As shown in FIG. 9, the plurality of microphones include a microphone 1, a microphone 2, a microphone 3, and a microphone 4, spatial coordinates of the microphone 1 are $(x_1, y_1, z_1)$, spatial coordinates of the microphone 2 are $(x_2, y_2, z_2)$, spatial coordinates of the microphone 3 are $(x_3, y_3, z_3)$, and spatial coordinates of the microphone 4 are $(x_4, y_4, z_4)$. Assuming that spatial coordinates of the sound source are $(x_s, y_s, z_s)$, the spatial location of the first sound source may be solved by using the following ternary quadratic equations (refer to a formula (5) to a formula (7)):

$$\sqrt{(x_s-x_1)^2+(y_s-y_1)^2+(z_s-z_1)^2} - \sqrt{(x_s-x_2)^2+(y_s-y_2)^2+(z_s-z_2)^2}=L12 \qquad \text{Formula (5)}$$

$$\sqrt{(x_s-x_1)^2+(y_s-y_1)^2+(z_s-z_1)^2} - \sqrt{(x_s-x_3)^2+(y_s-y_3)^2+(z_s-z_3)^2}=L13 \qquad \text{Formula (6)}$$

$$\sqrt{(x_s-x_1)^2+(y_s-y_1)^2+(z_s-z_1)^2} - \sqrt{(x_s-x_4)^2+(y_s-y_4)^2+(z_s-z_4)^2}=L14 \qquad \text{Formula (7)}$$

L12 is a difference between a distance from the sound source to the microphone 1 and a distance from the sound source to the microphone 2, L13 is a difference between the distance from the sound source to the microphone 1 and a distance from the sound source to the microphone 3, and L14 is a difference between the distance from the sound source to the microphone 1 and a distance from the sound source to the microphone 4.

In this embodiment of the present disclosure, sound source positioning may be further performed by using more microphones. For example, the spatial location of the first sound source is solved by using a plurality of ternary quadratic equations similar to the formula (5) to the formula (7), and an average value of a plurality of solved spatial locations is used as the spatial location of the first sound source, to improve spatial positioning accuracy of the sound source.

In this implementation, the plurality of microphones include at least four microphones.

A second implementation may be applied to the conference system shown in any one of FIG. 3 to FIG. 6. An implementation process of step 702 includes: searching in a search range by using an SRP-PHAT algorithm based on the first sound signals respectively received by the plurality of microphones and the second spatial location information of the plurality of microphones, to determine the spatial location of the first sound source, where the search range includes the sound pickup space.

The SRP-PHAT algorithm has strong robustness to reverberation. A basic principle of determining the spatial location of the sound source by using the SRP-PHAT algorithm is: calculating steered-response power (steered-response power, SRP) values corresponding, at a location of a hypothetical sound source, to the sound signals received by the plurality of microphones, and then searching, in the search range, for a location that maximizes the SRP value, where the location is the spatial location of the sound source.

Figure 10:
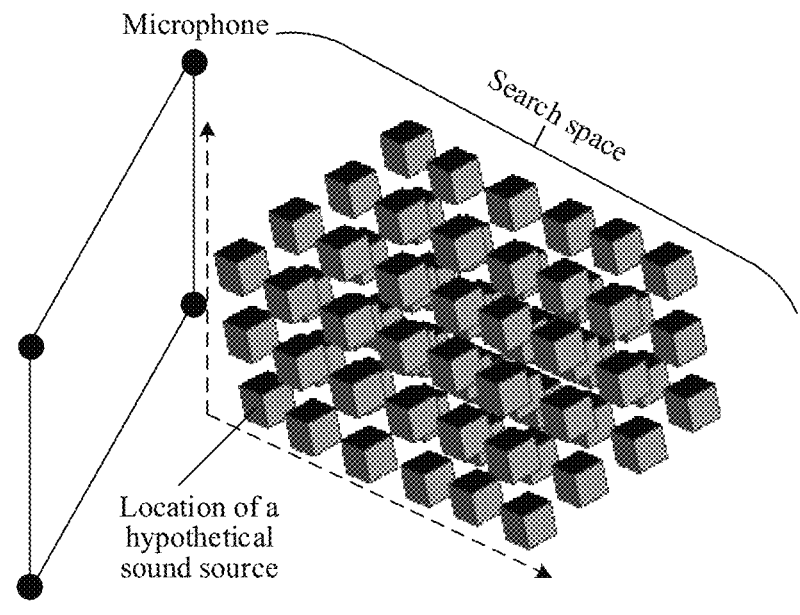
FIG. 10 is a schematic diagram of a space search according to an embodiment of the present disclosure.

For example, FIG. 10 is a schematic diagram of a space search according to an embodiment of the present disclosure. As shown in FIG. 10, search space is searched from the location of the hypothetical sound source to search for the location that maximizes the SRP value. A calculation formula of the SRP value is the following formula (8):

$$Y(x_s, y_s, z_s) = \sum_{k=1}^{K} \sum_{m=1}^{M} \frac{X_m(k)}{|X_m(k)|} s(k, x_s, y_s, z_s) \qquad \text{Formula (8)}$$

$Y(x_s, y_s, z_s)$ indicates the SRP value. $X_m(k)$ indicates a fast Fourier transform (fast Fourier transform, FFT) value of the $m^{th}$ microphone in a $k^{th}$ frequency band. $s(k, x_s, y_s, z_s)$ indicates a steering vector corresponding, in the $k^{th}$ frequency band, to a sound source whose spatial coordinates are $(x_s, y_s, z_s)$. K indicates a quantity of frequency bands obtained through division. M indicates a quantity of microphones.

For positioning of a single sound source, spatial coordinates $(x_s, y_s, z_s)$ of a maximum extremum point corresponding to $Y(x_s, y_s, z_s)$ may be used as a determined spatial location of the sound source. When positioning of the single sound source is performed, to determine whether the sound source is located in the sound pickup space or outside the sound pickup space, generally, a sound source search range needs to be appropriately expanded when sound source positioning is performed. For example, search space that includes the sound pickup space and that is larger than the sound pickup space is selected. If the location of the sound source still cannot be found (where the maximum extremum point cannot be found) after the sound source search range is expanded, whether the sound source is located in the sound pickup space may be determined by determining a location of a point that maximizes the SRP value. When the point that maximizes the SRP value is at a boundary of the search range, it may be determined that the sound source is located outside the sound pickup space.

For positioning of a plurality of sound sources, spatial coordinates $(x_s, y_s, z_s)$ of a plurality of extremum points corresponding to $Y(x_s, y_s, z_s)$ may be used as determined spatial locations of the plurality of sound sources.

Figure 11:
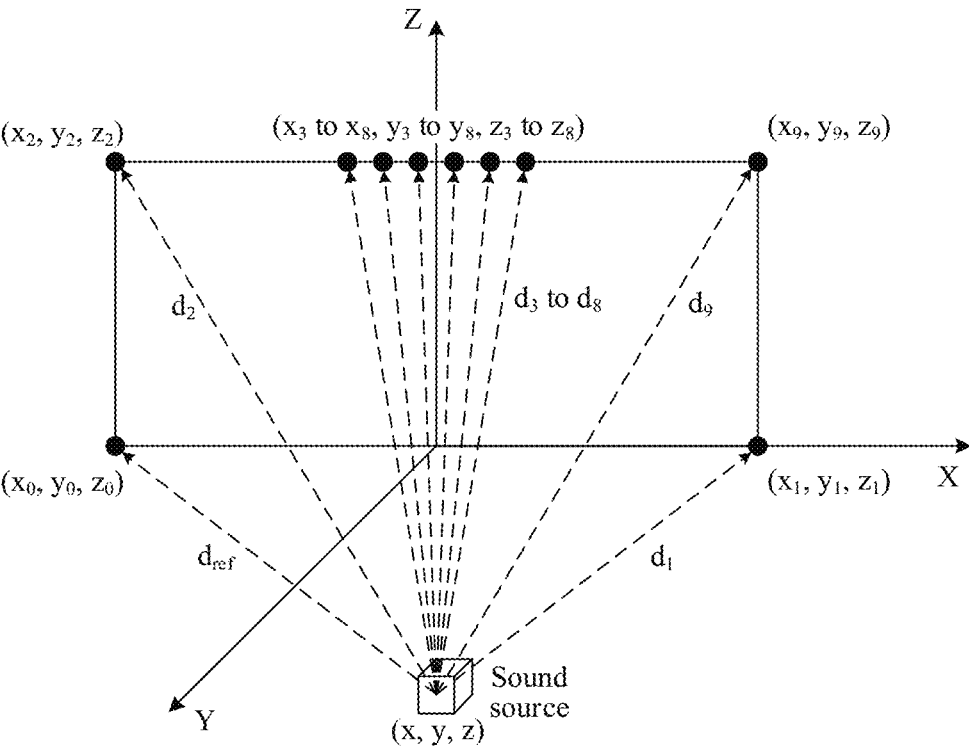
FIG. 11 is a schematic diagram of a layout of a plurality of microphones according to an embodiment of the present disclosure.

The steering vector that corresponds to the sound source in the search space and that is for calculating the SRP value in the foregoing formula (8) may be calculated in advance based on a layout of the plurality of microphones and the search space. For example, FIG. 11 is a schematic diagram of a layout of a plurality of microphones according to an embodiment of the present disclosure. As shown in FIG. 11, spatial coordinates of 10 microphones are $(x_0, y_0, z_0)$, $(x_1, y_1, z_1)$, $(x_2, y_2, z_2)$, $(x_3, y_3, z_3)$, $(x_4, y_4, z_4)$, $(x_5, y_5, z_5)$, $(x_6, y_6, z_6)$, $(x_7, y_7, z_7)$, $(x_8, y_8, z_8)$, and $(x_9, y_9, z_9)$. In the layout of the microphones shown in FIG. 11, assuming that spatial coordinates of a sound source are $(x, y, z)$, a process of calculating a steering vector corresponding to the sound source is as follows:

First, distances $d_{ref}$ and $d_1$ to $d_9$ from the sound source to all the microphones are calculated. Calculation formulas are the following formula (9) to formula (18):

$$d_{ref}=\sqrt{(x-x_0)^2+(y-y_0)^2+(z-z_0)^2} \qquad \text{Formula (9)}$$

$$d_1=\sqrt{(x-x_1)^2+(y-y_1)^2+(z-z_1)^2} \qquad \text{Formula (10)}$$

$$d_2=\sqrt{(x-x_2)^2+(y-y_2)^2+(z-z_2)^2} \qquad \text{Formula (11)}$$

$$d_3=\sqrt{(x-x_3)^2+(y-y_3)^2+(z-z_3)^2} \qquad \text{Formula (12)}$$

$$d_4=\sqrt{(x-x_4)^2+(y-y_4)^2+(z-z_4)^2} \qquad \text{Formula (13)}$$

$$d_5=\sqrt{(x-x_5)^2+(y-y_5)^2+(z-z_5)^2} \qquad \text{Formula (14)}$$

$$d_6=\sqrt{(x-x_6)^2+(y-y_6)^2+(z-z_6)^2} \qquad \text{Formula (15)}$$

$$d_7=\sqrt{(x-x_7)^2+(y-y_7)^2+(z-z_7)^2} \qquad \text{Formula (16)}$$

$$d_8=\sqrt{(x-x_8)^2+(y-y_8)^2+(z-z_8)^2} \qquad \text{Formula (17)}$$

$$d_9=\sqrt{(x-x_9)^2+(y-y_9)^2+(z-z_9)^2} \qquad \text{Formula (18)}$$

Then, the steering vector is calculated based on the distances from the sound source to all the microphones. The calculation formula is the following formula (19):

$$s(k,x,y,z)=\begin{bmatrix} 1 \\ e^{j\frac{2\pi c}{(k/K)*(f_s/2)}(d_1-d_{ref})} \\ e^{j\frac{2\pi c}{(k/K)*(f_s/2)}(d_2-d_{ref})} \\ e^{j\frac{2\pi c}{(k/K)*(f_s/2)}(d_3-d_{ref})} \\ \vdots \\ e^{j\frac{2\pi c}{(k/K)*(f_s/2)}(d_9-d_{ref})} \end{bmatrix} \qquad \text{Formula (19)}$$

$f_s$ indicates an audio sampling rate. $(k/K)*(f_s/2)$ indicates a sound signal frequency. c indicates a sound speed. In the formula (19), the $1^{st}$ microphone is selected as a reference microphone, and $(d_m-d_{ref})$ represents a difference between a distance from the sound source to the $m^{th}$ microphone and a distance from the sound source to the $1^{st}$ microphone.

A third implementation may be applied to the conference system shown in any one of FIG. 3 to FIG. 6. The plurality of microphones include a linear microphone array, and a two-dimensional microphone array of an integrated structure may alternatively be considered as including a plurality of linear microphone arrays. An implementation process of step 702 includes step 7021B to step 7023B below.

In step 7021B, an azimuth of the first sound source relative to the linear microphone array is determined based on first sound signals received by the linear microphone array.

Figure 12:
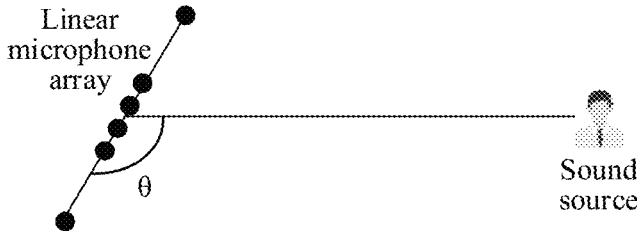
FIG. 12 is a schematic diagram of an azimuth of a sound source relative to a linear microphone array according to an embodiment of the present disclosure.

For example, FIG. 12 is a schematic diagram of an azimuth of a sound source relative to a linear microphone array according to an embodiment of the present disclosure. As shown in FIG. 12, the azimuth θ of the sound source relative to the linear microphone array may be an angle between a connection line between the sound source and a center of the linear microphone array and an arrangement direction of the linear microphone array.

Optionally, the azimuth of the sound source relative to the linear microphone array may be determined by using an SRP-PHAT algorithm. A basic principle of determining the azimuth of the sound source relative to the linear microphone array by using the SRP-PHAT algorithm is: calculating SRP values corresponding, at all azimuths, to the sound signals received by the linear microphone array, and then searching, in a search angle range, for an angle that maximizes the SRP value, where the angle is the azimuth of the sound source relative to the linear microphone array. The search angle range may be from 0° to 180°. A calculation formula of the SRP value is the following formula (20):

$$Y(\theta) = \sum_{k=1}^{K} \sum_{n=1}^{N} \frac{X_n(k)}{|X_n(k)|} s(k,\theta) \qquad \text{Formula (20)}$$

$Y(\theta)$ indicates the SRP value. $X_n(k)$ indicates an FFT value of an $n^{th}$ microphone in the linear microphone array in a $k^{th}$ frequency band. $s(k, \theta)$ indicates a steering vector corresponding, in the $k^{th}$ frequency band, to a sound source whose azimuth relative to the linear microphone array is θ. K indicates a quantity of frequency bands obtained through division. N indicates a quantity of microphones in the linear microphone array. A θ value that corresponds when a value of $Y(\theta)$ is maximized may be used as the determined azimuth of the sound source relative to the linear microphone array.

The steering vector that corresponds to the sound source in the search angle range and that is for calculating the SRP value in the foregoing formula (20) may be calculated in advance based on a layout of the plurality of microphones and search space. The calculation formula is the following (21):

$$s(k,\theta)=\begin{bmatrix} 1 \\ e^{j\frac{2\pi c}{(k/K)*(f_s/2)}l_1\ cos\theta} \\ e^{j\frac{2\pi c}{(k/K)*(f_s/2)}l_2\ cos\theta} \\ e^{j\frac{2\pi c}{(k/K)*(f_s/2)}l_3\ cos\theta} \\ \vdots \\ e^{j\frac{2\pi c}{(k/K)*(f_s/2)}l_{N-1}\ cos\theta} \end{bmatrix} \qquad \text{Formula (21)}$$

$f_s$ indicates an audio sampling rate. $(k/K)*(f_s/2)$ indicates a sound signal frequency. c indicates a sound speed. In the formula (21), the $1^{st}$ microphone is selected as a reference microphone, $l_n$ indicates a distance from the $n^{th}$ microphone to the $1^{st}$ microphone, and $l_n$ cos θ indicates a difference between a distance from the sound source to the $n^{th}$ microphone and a distance from the sound source to the $1^{st}$ microphone.

In step 7022B, a search plane is determined based on the azimuth of the first sound source relative to the linear microphone array and spatial location information of each microphone in the linear microphone array, where the first sound source is located on the search plane, and an angle between the search plane and a straight line on which the linear microphone array is located is equal to the azimuth of the first sound source relative to the linear microphone array.

Optionally, the linear microphone array is horizontally arranged. That is, array element centers of the linear microphone array are located on a same horizontal line. In this case, the azimuth of the first sound source relative to the linear microphone array is slightly affected by the height of the first sound source. Therefore, the azimuth of the first sound source relative to the linear microphone array may be approximately considered as a horizontal azimuth. Correspondingly, the search plane determined based on the horizontal azimuth is a vertical plane perpendicular to the horizontal plane. Assuming that the azimuth of the first sound source relative to the linear microphone array is θ, coordinates (x, y) of each point on the determined search plane on the horizontal plane satisfy: $\tan(x/y)=\tan \theta$.

Figure 13:
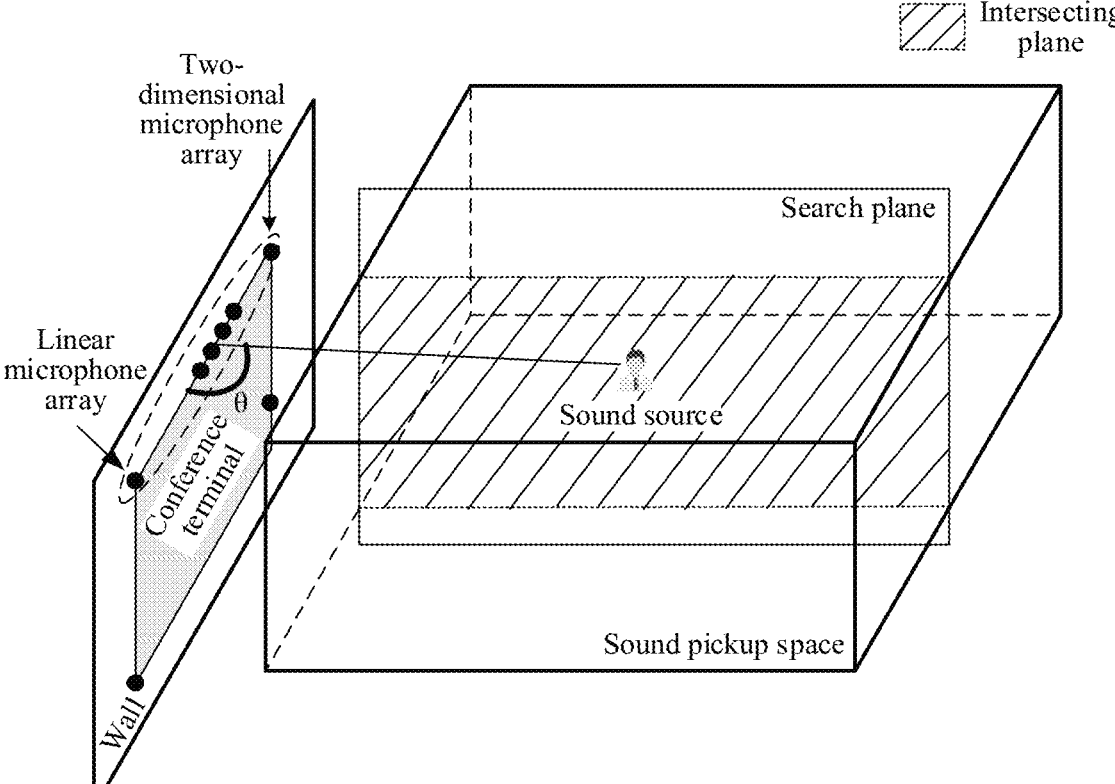
FIG. 13 is a schematic diagram of a location of a search plane according to an embodiment of the present disclosure.

For example, refer to the conference system shown in FIG. 3. FIG. 13 is a schematic diagram of a location of a search plane according to an embodiment of the present disclosure. As shown in FIG. 13, a row of microphones horizontally arranged in the two-dimensional microphone array built in the conference terminal disposed on the wall may be considered as a linear microphone array, an azimuth of a sound source relative to the linear microphone array is θ, the search plane is a vertical plane, the sound source is located on the search plane, and the search plane intersects sound pickup space. That is, the search plane and the sound pickup space have an intersecting plane.

In step 7023B, searching is performed in a search range by using the SRP-PHAT algorithm, to determine the spatial location of the first sound source, where the search range includes an intersecting plane of the search plane and the sound pickup space.

For an implementation process of step 7023B, refer to the implementation process of searching in the search range by using the SRP-PHAT algorithm in the foregoing second implementation. Details are not described herein again in this embodiment of the present disclosure.

The search range is obtained based on the intersecting plane of the search plane and the sound pickup space. For the intersecting plane, refer to the intersecting plane shown in FIG. 13. Optionally, that the search range includes an intersecting plane of the search plane and the sound pickup space may be that the search range includes only the intersecting plane of the search plane and the sound pickup space. In this way, the intersecting plane of the search plane and the sound pickup space only needs to be searched for the location of the sound source. Alternatively, that the search range includes an intersecting plane of the search plane and the sound pickup space may be that the search range includes the intersecting plane of the search plane and the sound pickup space and an area around the intersecting plane. In this way, the search range is appropriately expanded, so that positioning accuracy of the location of the sound source can be improved.

In this implementation, the azimuth of the sound source relative to the linear microphone array is first determined by using the linear microphone array, the search plane is determined based on the azimuth of the sound source relative to the linear microphone array, and then the search range is determined with reference to the search plane and the sound pickup space. In this way, the determined search range is small. A space search volume can be reduced to a large extent in comparison with that in the foregoing second implementation. This can save a computing resource, and improve sound source positioning efficiency.

A fourth implementation may be applied to the conference system shown in any one of FIG. 3 to FIG. 6. The plurality of microphones include a first linear microphone array and a second linear microphone array. An implementation process of step 702 includes step 7021C to step 7026C below.

In step 7021C, an azimuth of the first sound source relative to the first linear microphone array is determined based on first sound signals received by the first linear microphone array.

In step 7022C, a first search plane is determined based on the azimuth of the first sound source relative to the first linear microphone array and spatial location information of each microphone in the first linear microphone array, where the first sound source is located on the first search plane, and an angle between the first search plane and a straight line on which the first linear microphone array is located is equal to the azimuth of the first sound source relative to the first linear microphone array.

For an implementation process of step 7021C and step 7022C, refer to the related implementation process of step 7021B and step 7022B. Details are not described herein again in this embodiment of the present disclosure.

In step 7023C, an azimuth of the first sound source relative to the second linear microphone array is determined based on first sound signals received by the second linear microphone array.

In step 7024C, a second search plane is determined based on the azimuth of the first sound source relative to the second linear microphone array and spatial location information of each microphone in the second linear microphone array, where the first sound source is located on the second search plane, and an angle between the second search plane and a straight line on which the second linear microphone array is located is equal to the azimuth of the first sound source relative to the second linear microphone array.

For an implementation process of step 7023C and step 7024C, refer to the related implementation process of step 7021B and step 7022B. Details are not described herein again in this embodiment of the present disclosure.

In step 7025C, a search range is determined based on a location of an intersecting line of the first search plane and the second search plane, where the first search plane and the second search plane are not coplanar.

Because the sound source is located on both the first search plane and the second search plane, when the first search plane and the second search plane are not coplanar, the sound source is likely to be located on the intersecting line of the first search plane and the second search plane, and then the search range may be determined based on the location of the intersecting line of the first search plane and the second search plane. If the first search plane and the second search plane are coplanar, spatial positioning of the sound source is implemented by using the foregoing third implementation.

Figure 14:
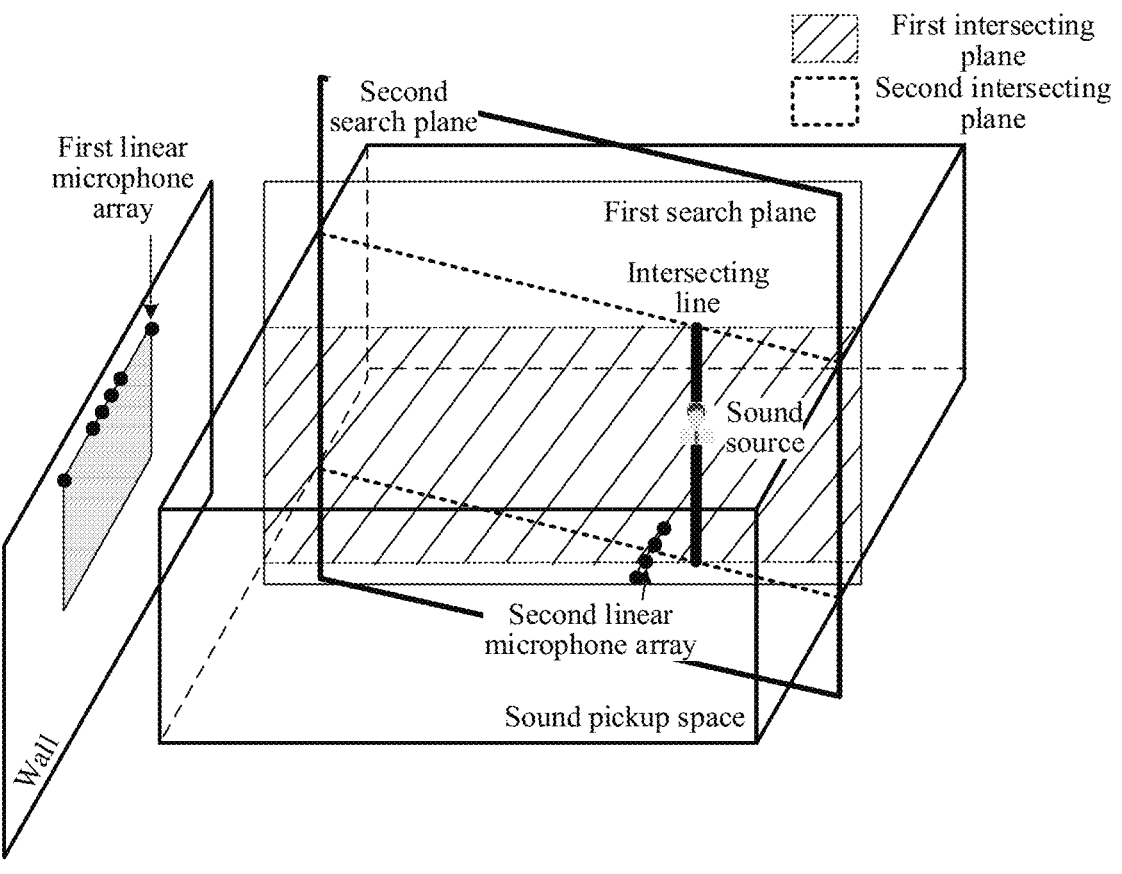
FIG. 14 is a schematic diagram of locations of a first search plane, a second search plane, and sound pickup space according to an embodiment of the present disclosure.

Optionally, if the intersecting line of the first search plane and the second search plane intersects the sound pickup space, the search range may be determined based on an intersecting part between the intersecting line of the first search plane and the second search plane and the sound pickup space, to further reduce the search range. For example, refer to the conference system shown in FIG. 5. FIG. 14 is a schematic diagram of locations of a first search plane, a second search plane, and sound pickup space according to an embodiment of the present disclosure. As shown in FIG. 14, the first linear microphone array is horizontally arranged on the wall, and the second linear microphone array is horizontally arranged in the sound pickup space, for example, may be horizontally placed on the conference table (not shown in the figure). The first search plane and the sound pickup space have a first intersecting plane, the second search plane and the sound pickup space have a second intersecting plane, and the search range may include an intersecting line of the first intersecting plane and the second intersecting plane.

In step 7026C, searching is performed in the search range by using an SRP-PHAT algorithm, to determine the spatial location of the first sound source.

For an implementation process of step 7026C, refer to the implementation process of searching in the search range by using the SRP-PHAT algorithm in the foregoing second implementation. Details are not described herein again in this embodiment of the present disclosure.

In this implementation, the azimuth of the sound source relative to each linear microphone array is determined by using the two linear microphone arrays separately, one search plane is determined based on the azimuth of the sound source relative to one linear microphone array, and then the search range is determined based on the location of the intersecting line of the two search planes. In this way, the determined search range is small. A space search volume can be reduced to a large extent in comparison with that in the foregoing second implementation and that in the foregoing third implementation. This can save a computing resource, and improve sound source positioning efficiency.

The spatial positioning accuracy of the sound source is affected by the quantity and the layout of the plurality of microphones in addition to the algorithm. Usually, a larger quantity of microphones indicates larger distribution space of the microphones and higher positioning accuracy of the sound source. For example, in consideration of a spatial limitation of the microphones during actual deployment, it may be designed that an arrangement length range of the microphones in a horizontal direction is 1 meter to 2.5 meters and an arrangement length range of the microphones in a height direction is 1 meter to 2.5 meters. A sound pickup effect of sound pickup space with the length of approximately 6 meters, the width of approximately 6 meters, and the height of approximately 3 meters can be satisfied. In addition, the spatial positioning accuracy of the sound source can be high.

For the conference systems shown in FIG. 3 and FIG. 5, the two-dimensional microphone array or the linear microphone array is built in the conference terminal. Because a size of the conference terminal is limited, the microphone may be deployed as much as possible at an edge location of the conference terminal, to maximize distribution space of the microphones.

For the conference system shown in FIG. 4, the two-dimensional microphone array may be deployed on a vertical plane (for example, the wall), to maximize distribution space of the microphones.

For the conference systems shown in FIG. 5 and FIG. 6, the two linear microphone arrays may both be arranged horizontally to implement positioning of the sound source in the horizontal direction, and a height difference may be formed between the two linear microphone arrays in a vertical direction to implement positioning of the sound source in the height direction. For example, the first linear microphone array may be horizontally arranged on the wall, and the second linear microphone array may be horizontally arranged on the conference table.

Step 703: Determine, based on the spatial location of the first sound source and the first spatial location information, whether the first sound source is located in the sound pickup space. If the first sound source is located in the sound pickup space, perform step 704; or if the first sound source is located outside the sound pickup space, perform step 705.

If spatial coordinates of the first sound source are within a spatial coordinate range corresponding to the sound pickup space, it is determined that the first sound source is located in the sound pickup space. If spatial coordinates of the first sound source are beyond a spatial coordinate range corresponding to the sound pickup space, it is determined that the first sound source is located outside the sound pickup space.

Step 704: Perform enhancement processing on the sound signals emitted by the first sound source.

Optionally, the conference terminal may perform processing such as filtering and echo cancellation on the sound signals emitted by the first sound source, to enhance the sound signals.

Optionally, the conference terminal may further perform processing such as audio mixing on sound signals on which enhancement processing is performed, to obtain sound signals having a better effect. Then, the conference terminal may further encode the sound signals, and send encoded sound signals to a remote conference terminal, to implement teleconferencing communication.

In this embodiment of the present disclosure, the conference terminal can determine the spatial location of the sound source based on the sound signals respectively received by the plurality of microphones and the spatial location information of the plurality of microphones. With reference to the spatial location information of the preconfigured sound pickup space, whether the sound source is located in the sound pickup space or outside the sound pickup space can be further determined. In addition, enhancement processing is performed only on the sound signals emitted by the sound source located in the sound pickup space, to enhance only the sound signals emitted by the sound source located in the sound pickup space. When the solution is applied to a conference scenario, sound sources in different space can be effectively distinguished, and sound in the sound pickup space can be enhanced, to improve a conference sound pickup effect.

Step 705: Perform suppression processing on the sound signals emitted by the first sound source.

Optionally, the conference terminal performs suppression processing on the sound signals emitted by the first sound source, and does not encode and send the sound signals, so that the remote conference terminal does not receive the sound signals.

In this embodiment of the present disclosure, the conference terminal may perform suppression processing on the sound signals emitted by the sound source located outside the sound pickup space, and does not send the sound signals to the remote conference terminal, so that the sound signals emitted by the sound source located outside the sound pickup space are suppressed, and the conference sound pickup effect can be further improved. In addition, if the sound pickup space is configured as closed space, noise may be suppressed in not only the horizontal direction but also the height direction. That is, all-round noise suppression is implemented, so that the conference sound pickup effect can be further improved.

Optionally, the first sound signal is a human sound signal. That is, the first sound source is a human sound source. In the conference scenario, all sound (for example, keyboard sound, air-conditioner sound, and computer-fan sound) other than human sound may be considered as noise.

In some implementations, when the sound pickup space is configured, a location of a fixed noise source may be considered, so that the configured sound pickup space does not include the location of the fixed noise source, to implement elaborate configuration of the sound pickup space.

Figure 15:
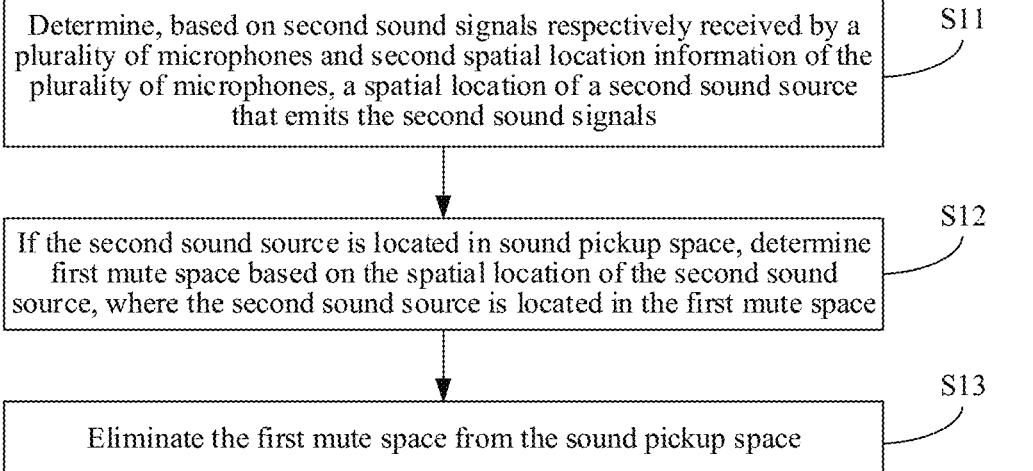
FIG. 15 is a schematic diagram of an implementation procedure of adjusting sound pickup space according to an embodiment of the present disclosure.

In some other implementations, the conference terminal may automatically identify a spatial location of a non-human sound source in the sound pickup space in a sound pickup process of the plurality of microphones, and eliminate the location of the non-human sound source from the sound pickup space. FIG. 15 is a schematic diagram of an implementation procedure of adjusting sound pickup space according to an embodiment of the present disclosure. The implementation procedure includes step S11 to step S13 below.

Step S11: Determine, based on second sound signals respectively received by the plurality of microphones and the second spatial location information of the plurality of microphones, a spatial location of a second sound source that emits the second sound signals.

The second sound signal is a non-human sound signal, and the second sound signal may also be referred to as a noise signal. The second sound source is a non-human sound source, and the second sound source may also be referred to as a noise source. Optionally, sound signals received by the plurality of microphones are detected through artificial intelligence (artificial intelligence, AI) voice activity detection (voice activity detection, VAD), to identify a non-human sound signal in the sound signals.

For an implementation process of step S11, refer to the implementation process of step 702. Details are not described herein again in this embodiment of the present disclosure.

Step S12: If the second sound source is located in the sound pickup space, determine first mute space based on the spatial location of the second sound source, where the second sound source is located in the first mute space.

Optionally, space with the length of L', the width of W', and the height of H' may be set as the first mute space by using the spatial location of the second sound source as a center. For example, values of L', W', and H' are all 0.5 meter. Both a shape and a size of the first mute space may be set based on an actual requirement. This is not limited in this embodiment of the present disclosure.

Optionally, when the second sound source continuously emits the sound signals, the first mute space is determined based on the spatial location of the second sound source.

Figure 16:
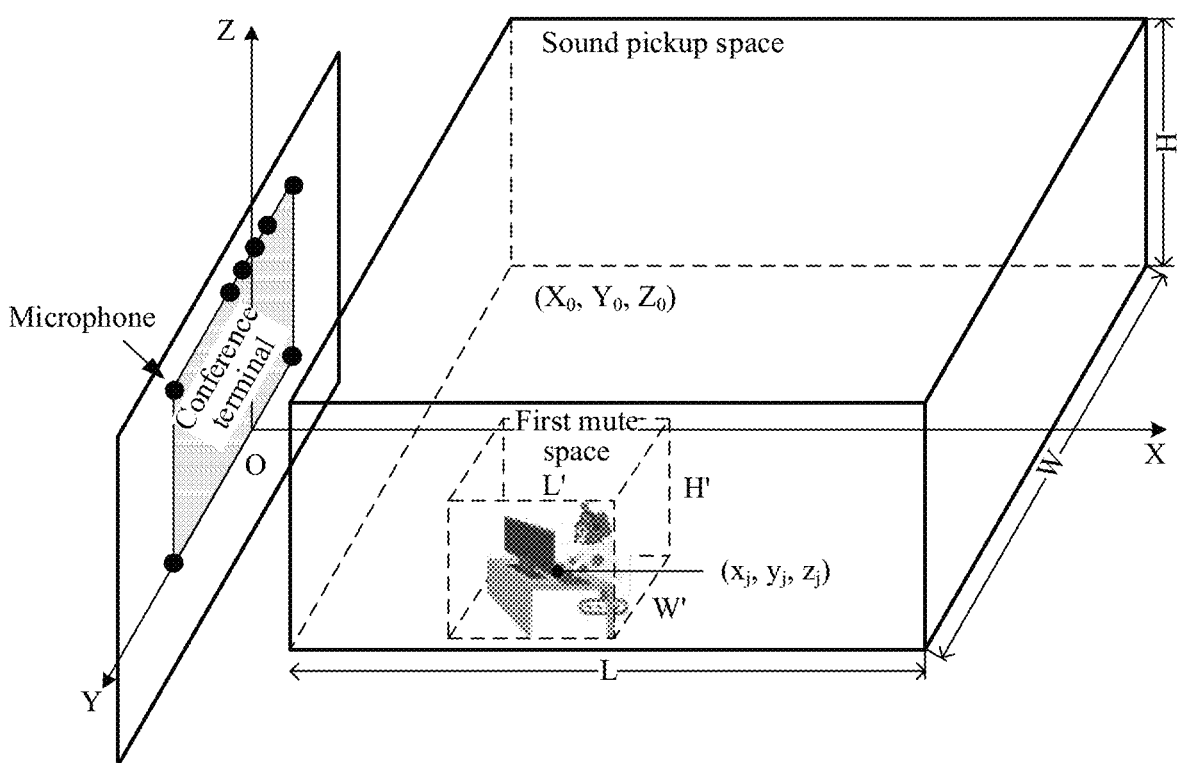
FIG. 16 is a schematic diagram of a setting of first mute space according to an embodiment of the present disclosure.

For example, it is assumed that the second sound source is keyboard sound of a typist. Based on the spatial coordinate system shown in FIG. 8, FIG. 16 is a schematic diagram of a setting of first mute space according to an embodiment of the present disclosure. As shown in FIG. 16, spatial coordinates of the second sound source are $(x_j, y_j, z_j)$, the length of the first mute space is L', the width of the first mute space is W', and the height of the first mute space is H'. Therefore, a spatial coordinate range of the first mute space is $(x_j-L'/2$ to $x_j+L'/2, y_j-W'/2$ to $y_j+W'/2, z_j-H'/2$ to $z_j+H'/2)$.

Step S13: Eliminate the first mute space from the sound pickup space.

The eliminating the first mute space from the sound pickup space may be understood as that the spatial coordinate range of the sound pickup space does not include the spatial coordinate range of the first mute space, to update the sound pickup space.

Optionally, when duration in which there is no human sound source in the first mute space reaches target duration, the first mute space is eliminated from the sound pickup space. When there is a human sound source in the first mute space, a range of the first mute space may be narrowed down or this time of adjustment of the sound pickup space may be stopped, to avoid false suppression of the human sound source.

In this embodiment of the present disclosure, the noise signals from the sound pickup space are identified, spatial positioning is performed on the noise source that emits the noise signals, and then the location of the noise source is eliminated from the sound pickup space, to implement adaptive adjustment of the sound pickup space, thereby suppressing the noise in the preset sound pickup space and improving the conference sound pickup effect.

Figure 17:
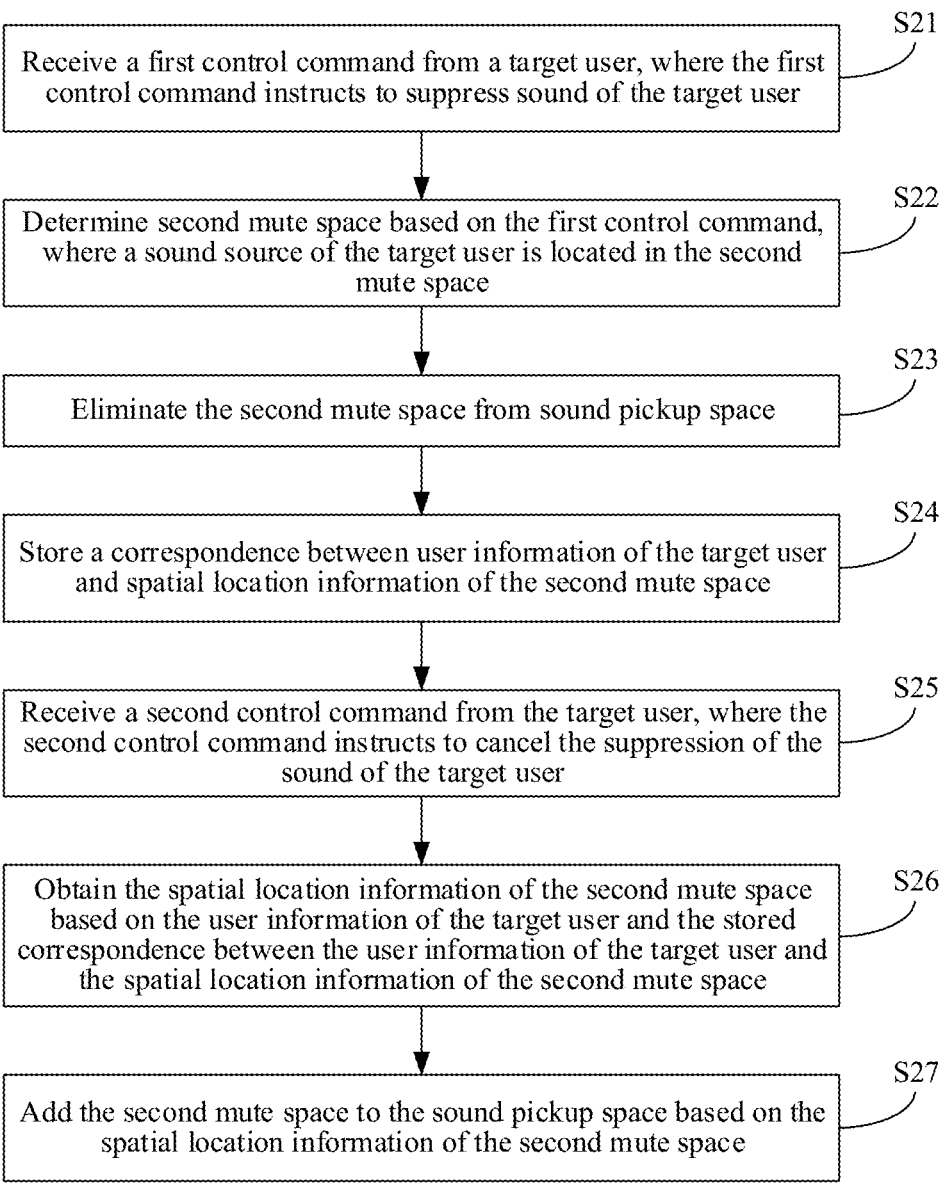
FIG. 17 is a schematic diagram of another implementation procedure of adjusting sound pickup space according to an embodiment of the present disclosure.

Optionally, in this embodiment of the present disclosure, the sound pickup space may alternatively be adjusted based on a control instruction of a user. FIG. 17 is a schematic diagram of another implementation procedure of adjusting sound pickup space according to an embodiment of the present disclosure. The implementation procedure includes step S21 to step S27 below.

Step S21: Receive a first control command from a target user, where the first control command instructs to suppress sound of the target user.

Optionally, the first control command includes but is not limited to a voice control command or a body control command. The body control command may be, for example, a gesture control command.

If the first control command is the voice control command, the conference terminal receives first control instructions by using the plurality of microphones. For example, when the conference terminal receives a sound signal such as "Please keep mute", it is determined that the first control commands are received.

If the first control command is the body control command, the conference terminal receives the first control command based on an image captured by a target camera, where the image includes imaging of the target user. That the conference terminal receives the first control command based on an image captured by a target camera may be understood as that the conference terminal determines, by identifying a body movement of the target user in the image captured by the target camera, whether the first control instruction from the target user is received.

The target camera is built in the conference terminal, or the target camera is external and connected to the conference terminal. Optionally, the target camera is a binocular camera, or the target camera is integrated with a depth sensor. Depth information may be obtained based on an image captured by the binocular camera or the camera integrated with the depth sensor. In this embodiment of the present disclosure, the image based on which the depth information may be obtained is collectively referred to as a depth image. The depth sensor may be ultrasonic radar, millimeter-wave radar, laser radar, or a structured-light sensor. This is not limited in this embodiment of the present disclosure. It should be understood that the depth sensor may alternatively be another device that may measure a distance. Alternatively, if the target camera is a monocular camera, the image captured by the target camera is a two-dimensional image.

Step S22: Determine second mute space based on the first control command, where a sound source of the target user is located in the second mute space.

In a first possible implementation, if the first control command is the voice control command, an implementation process of the determining second mute space based on the first control command includes step S221A and step S222A below.

In step S221A, a spatial location of the sound source of the target user is determined based on the first control commands respectively received by the plurality of microphones and the second spatial location information of the plurality of microphones.

For an implementation process of step S221A, refer to the implementation process of step 702. Details are not described herein again in this embodiment of the present disclosure.

In step S222A, if the spatial location of the sound source of the target user is located in the sound pickup space, the second mute space is determined based on the spatial location of the sound source of the target user.

For an implementation process of step S222A, refer to the implementation process of step S12. For a manner of setting the second mute space, refer to the manner of setting the first mute space. Details are not described herein again in this embodiment of the present disclosure.

In a second possible implementation, if the first control command is the body control command, and the image captured by the target camera is the depth image, an implementation process of the determining second mute space based on the first control command includes step S221B and step S222B below.

In step S221B, spatial location information of the target user is determined based on information about a location of the imaging of the target user in the image and spatial location information of the target camera.

The spatial location information of the target camera may be pre-calibrated. The spatial location information of the target camera, the spatial location information of the sound pickup space, and the spatial location information of the microphones may all be represented by using spatial coordinates in a same spatial coordinate system.

Optionally, a facial location of the target user may be used as a location of the target user, and facial information of the target user may be recognized in the image by using a facial recognition technology, where the facial information includes information about a location of imaging of a face in the image. Then, the spatial location information of the target user is determined based on the information about the location of the imaging of the face of the target user in the image. Optionally, the facial information further includes a facial feature, and the facial feature may be used as user information that identifies the target user.

Optionally, if the target camera is the binocular camera, and the depth image captured by the target camera includes two images, an implementation process of step S221B may include step B1 to step B4 below.

Step B1: Determine a distance from the target user to the target camera based on information about locations of the imaging of the target user in the two images.

A difference between the locations of the imaging of the target user in the two images is parallax. The distance from the target user to the target camera may be obtained based on the parallax.

Step B2: Determine information about a horizontal angle of the target user relative to the target camera based on a correspondence between information about a location of the imaging of the target user in either of the two images and a horizontal field of view of the target camera.

If a correspondence between information about a location of one image captured by the target camera and the horizontal field of view of the target camera is F(p), where p is the information about the location, the information about the location of the imaging of the target user in the image is substituted into F(p), to obtain the information about the horizontal angle of the target user relative to the target camera.

Step B3: Determine information about a horizontal location of the target user relative to the target camera based on the distance from the target user to the target camera and the information about the horizontal angle of the target user relative to the target camera.

Optionally, the conference terminal may obtain the information about the horizontal location of the target user relative to the target camera through calculation based on the distance from the target user to the target camera and the information about the horizontal angle of the target user relative to the target camera by using a trigonometric function relationship. The information about the horizontal location of the target user relative to the target camera may be represented by using two-dimensional coordinates in a planar coordinate system parallel to a horizontal plane, where the planar coordinate system may use a location of the target camera as an origin.

Step B4: Determine the spatial location information of the target user based on the information about the horizontal location of the target user relative to the target camera, information about a height location of the target user relative to the target camera, and the spatial location information of the target camera.

The information about the height location of the target user relative to the target camera may be obtained based on the information about the location of the imaging of the target user in the image.

It is assumed that the planar coordinate system in step B3 is parallel to a coordinate system of the spatial coordinate system shown in FIG. 8 on an X-Y plane. That is, an x-axis of the planar coordinate system is parallel to the X-axis of the spatial coordinate system, and a y-axis of the planar coordinate system is parallel to the Y-axis of the spatial coordinate system. It is also assumed that the information about the horizontal location of the target user relative to the target camera is represented as $(x_q, y_q)$, the target user is h higher than the target camera, and spatial coordinates of the target camera in the spatial coordinate system are $(X_t, Y_t, Z_t)$. In this case, spatial coordinates of the target user in the spatial coordinate system are $(X_t+x_q, Y_t+y_q, Z_t+h)$.

In step S222B, if the target user is located in the sound pickup space, the second mute space is determined based on the spatial location information of the target user, where the target user is located in the second mute space.

Figure 18:
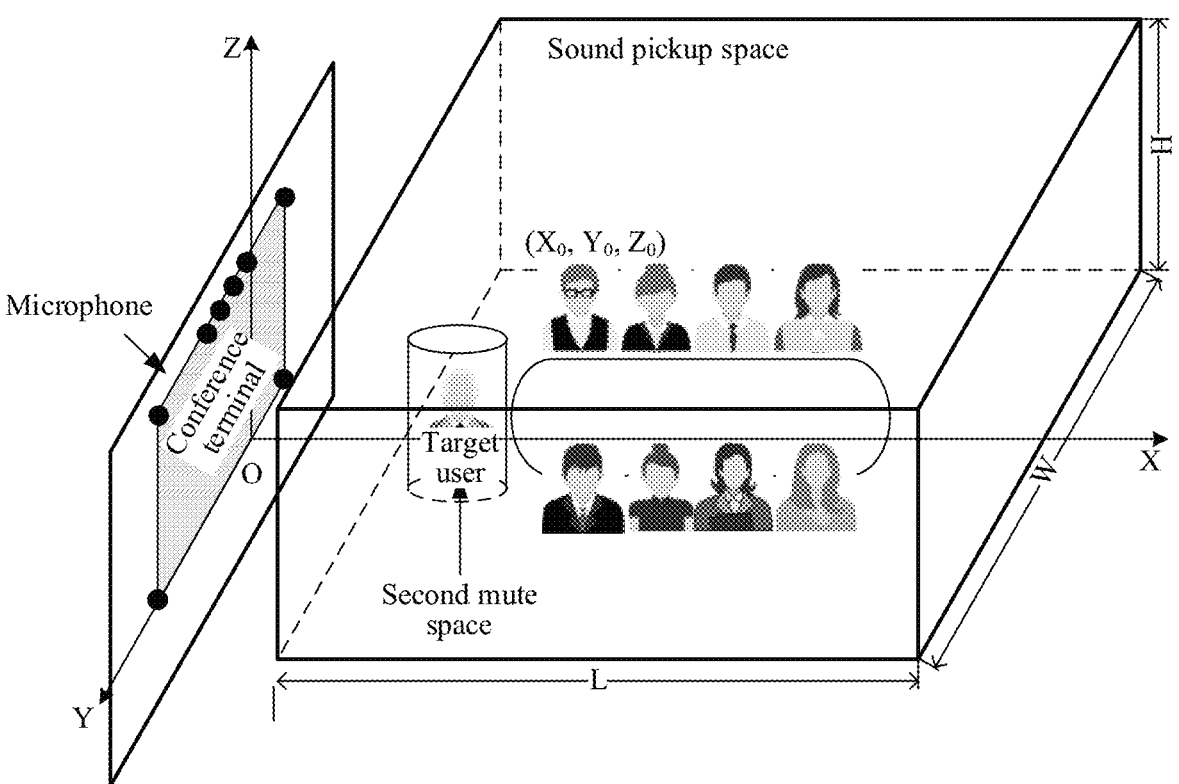
FIG. 18 is a schematic diagram of a setting of second mute space according to an embodiment of the present disclosure.

For example, based on the spatial coordinate system shown in FIG. 8, FIG. 18 is a schematic diagram of a setting of second mute space according to an embodiment of the present disclosure. As shown in FIG. 18, a circle is disposed on the horizontal plane by using horizontal coordinates of the face of the target user as a center of the circle and a distance (for example, 0.5 meter to 1 meter) as a radius, and cylinder space is formed in the vertical direction by using the circle as a reference, and is used as the second mute space.

Optionally, if the image collected by the target camera includes imaging of a plurality of users, a face closest to the face of the target user may be searched for, and a distance between the face closest to the face of the target user and the face of the target user is calculated. If the distance between the face closest to the face of the target user and the face of the target user is less than the specified radius, the radius of a cylinder is adjusted, so that the radius of the cylinder is less than the distance between the face closest to the face of the target user and the face of the target user. In this way, there is no face of a user other than the target user in the second mute space, to avoid false suppression of a sound source of the another user.

In a third possible implementation, if the first control command is the body control command, and the image captured by the target camera is a two-dimensional image, an implementation process of the determining second mute space based on the first control command includes step S221C and step S222C below.

In step S221C, information about a horizontal angle of the target user relative to the target camera is determined based on a correspondence between information about a location of the imaging of the target user in the image and a horizontal field of view of the target camera.

For an implementation process of step S221C, refer to the implementation process of step B2. Details are not described herein again in this embodiment of the present disclosure.

In step S222C, the second mute space is determined based on the information about the horizontal angle of the target user relative to the target camera, where the target user is located in the second mute space.

Figure 19:
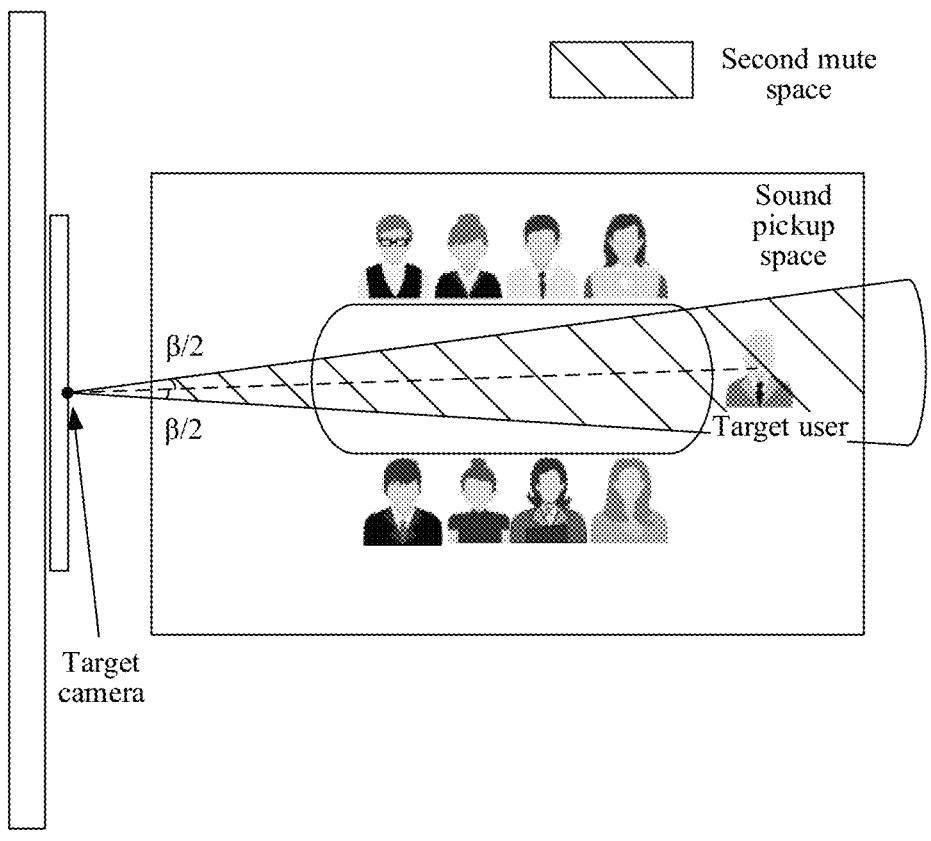
FIG. 19 is a schematic diagram of another setting of second mute space according to an embodiment of the present disclosure.

The conference terminal may detect, by using the image captured by the target camera, whether there is another user on a connection line between the target camera and the target user and on an extension line. If there is another user on the connection line between the target camera and the target user or the extension line, it is prompted that this time of the control command is invalid, and execution of the control command is terminated. If there is no other user on the connection line between the target camera and the target user and the extension line, a sector area in a specific range of the horizontal angle of the target user relative to the target camera is used as a mute range of the second mute space in the horizontal direction. A mute range of the second mute space in the height direction may be a height range of the sound pickup space, or may be determined based on height location information of the target user. For example, FIG. 19 is a schematic diagram of another setting of second mute space according to an embodiment of the present disclosure. As shown in FIG. 19, orthographic projection of the second mute space on the horizontal plane is an intersecting area between a sector area whose center angle is β and orthographic projection of the sound pickup space on the horizontal plane by using the connection line between the target user and the target camera as an angle bisector.

Step S23: Eliminate the second mute space from the sound pickup space.

In this embodiment of the present disclosure, the conference terminal may flexibly adjust the range of the sound pickup space based on the control instruction sent by the user, to suppress sound of a single user located in the preset sound pickup space, so that the single user can be muted in a conference process, and sound pickup flexibility is improved. The noise in the preset sound pickup space can be better suppressed through elaborate control of the sound pickup space.

Optionally, the user may further control the conference terminal to cancel the sound suppression, that is, cancel the muteness. For a specific implementation process, refer to step S24 to step S27 below.

Step S24: Store a correspondence between the user information of the target user and spatial location information of the second mute space.

Optionally, when the first control command is the voice control command, the user information in the stored correspondence includes a voiceprint of the target user; or when the first control command is the body control command, the user information in the stored correspondence includes the facial feature of the target user.

Step S25: Receive a second control command from the target user, where the second control command instructs to cancel the suppression of the sound of the target user.

Optionally, the second control instruction is a voice control command or a body control command. If the second control instruction is the voice control command, after the conference terminal receives the second control command, the conference terminal identifies, based on a sound signal corresponding to the second control command, the voiceprint of the user that sends the second control instruction. If the second control command is the body control command, after the conference terminal receives the second control command, the conference terminal performs, based on the image, facial recognition on the user that sends the second control instruction, to recognize the facial feature.

Step S26: Obtain the spatial location information of the second mute space based on the user information of the target user and the stored correspondence between the user information of the target user and the spatial location information of the second mute space.

If the conference terminal does not store the correspondence between the user information of the target user and the spatial location information of the second mute space, the conference terminal may prompt that this time of the control command is invalid, and terminate execution of the control command.

Step S27: Add the second mute space to the sound pickup space based on the spatial location information of the second mute space.

During specific implementation, the user may send the first control command and the second control command in a plurality of flexible and expedient manners. The voice control command and the body control command are merely used as examples for description.

In this embodiment of the present disclosure, the conference terminal may flexibly adjust the range of the sound pickup space based on the control instruction sent by the user, to cancel the suppression of the sound of the single user located in the preset sound pickup space, so that the single user can be unmuted in the conference process, and the sound pickup flexibility is improved.

The following describes software apparatus in embodiments of the present disclosure by using an example.

Figure 20:
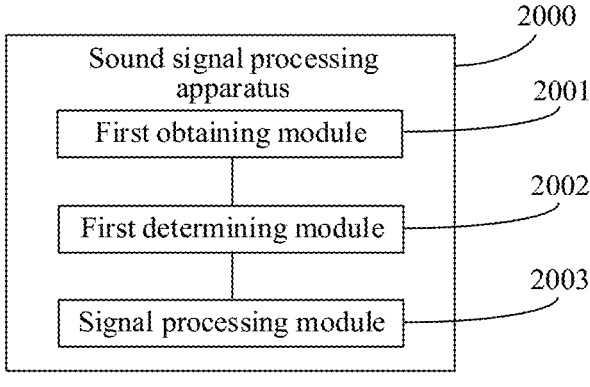
FIG. 20 is a schematic diagram of a structure of a sound signal processing apparatus according to an embodiment of the present disclosure.

FIG. 20 is a schematic diagram of a structure of a sound signal processing apparatus according to an embodiment of the present disclosure. As shown in FIG. 20, the communication apparatus 2000 includes:

a first obtaining module 2001, configured to obtain first spatial location information of sound pickup space and second spatial location information of a plurality of microphones, where the plurality of microphones are deployed non-linearly, and distances from the plurality of microphones to a specified location in the sound pickup space are not completely the same;

a first determining module 2002, configured to determine, based on first sound signals respectively received by the plurality of microphones and the second spatial location information, a spatial location of a first sound source that emits the first sound signals; and a signal processing module 2003, configured to: if the first sound source is located in the sound pickup space, perform enhancement processing on the sound signals emitted by the first sound source.

Figure 21:
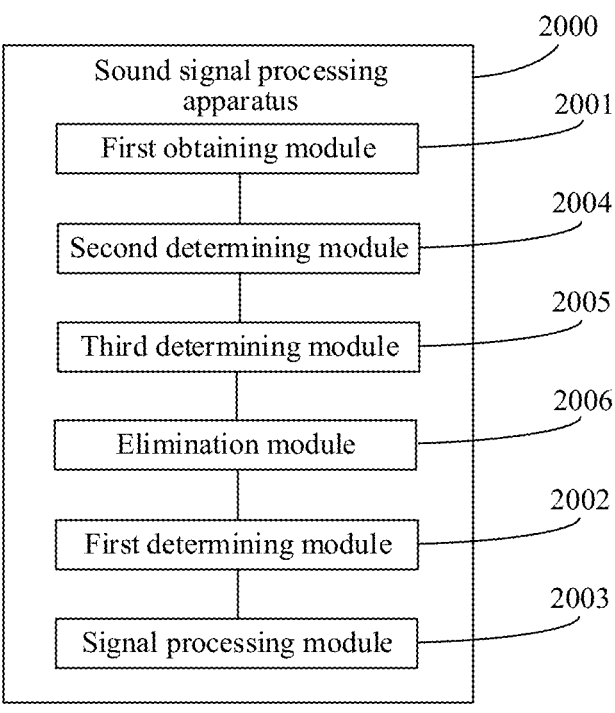
FIG. 21 is a schematic diagram of a structure of another sound signal processing apparatus according to an embodiment of the present disclosure.

Optionally, as shown in FIG. 21, the apparatus 2000 further includes: a second determining module 2004, configured to determine, based on second sound signals respectively received by the plurality of microphones and the second spatial location information, a spatial location of a second sound source that emits the second sound signals, where the second sound signal is a non-human sound signal; a third determining module 2005, configured to: if the second sound source is located in the sound pickup space, determine first mute space based on the spatial location of the second sound source, where the second sound source is located in the first mute space; and an elimination module 2006, configured to eliminate the first mute space from the sound pickup space.

Figure 22:
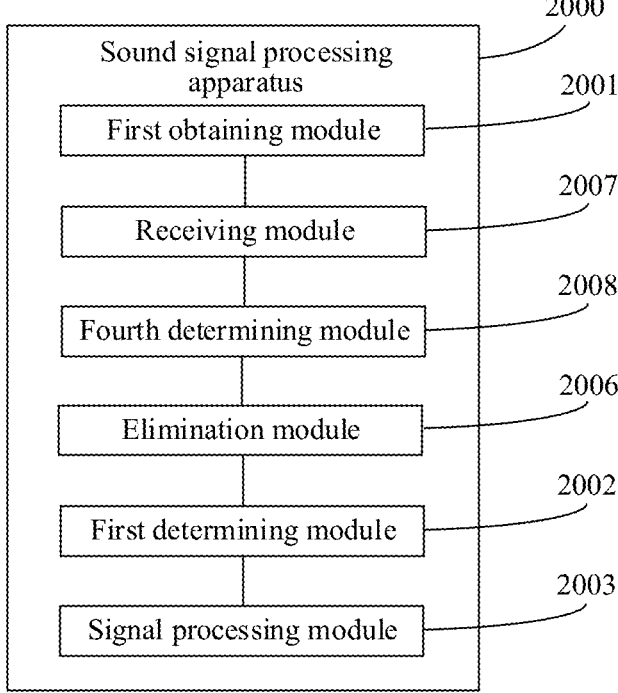
FIG. 22 is a schematic diagram of a structure of still another sound signal processing apparatus according to an embodiment of the present disclosure.

Optionally, as shown in FIG. 22, the apparatus 2000 further includes: a receiving module 2007, configured to receive a first control command from a target user, where the first control command instructs to suppress sound of the target user; and a fourth determining module 2008, configured to determine second mute space based on the first control command, where a sound source of the target user is located in the second mute space. The elimination module 2006 is configured to eliminate the second mute space from the sound pickup space.

Optionally, the first control command is a voice control command; the receiving module 2007 is configured to receive first control instructions by using the plurality of microphones; and the fourth determining module 2008 is configured to: determine a spatial location of the sound source of the target user based on the first control commands respectively received by the plurality of microphones and the second spatial location information; and if the spatial location of the sound source of the target user is located in the sound pickup space, determine the second mute space based on the spatial location of the sound source of the target user.

Optionally, the first control command is a body control command; the receiving module 2007 is configured to receive the first control instruction based on an image captured by a target camera, where the image includes imaging of the target user, and the image is a depth image; and the fourth determining module 2008 is configured to: determine spatial location information of the target user based on information about a location of the imaging of the target user in the image and spatial location information of the target camera; and if the target user is located in the sound pickup space, determine the second mute space based on the spatial location information of the target user, where the target user is located in the second mute space.

Figures 23, 24:
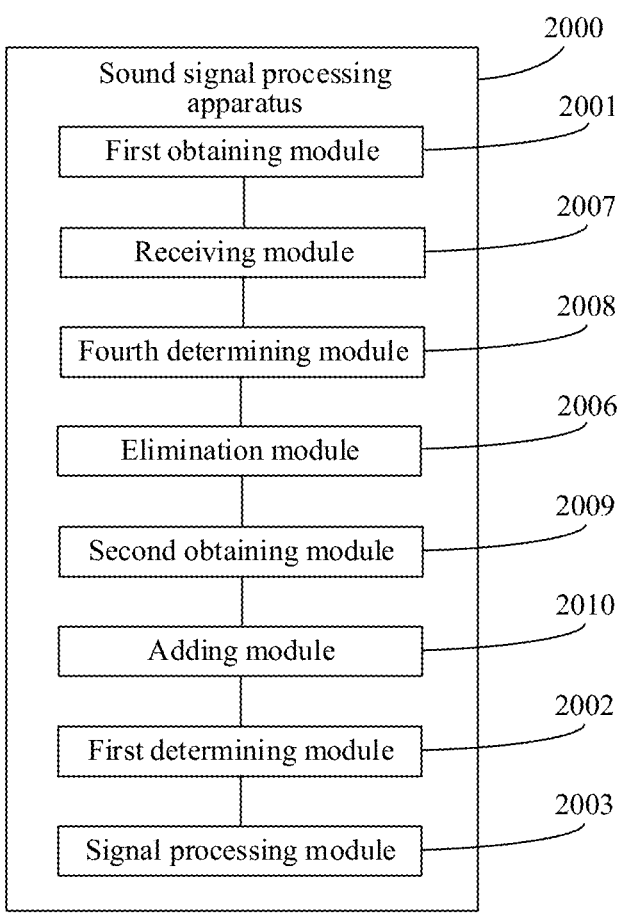
FIG. 23 is a schematic diagram of a structure of yet another sound signal processing apparatus according to an embodiment of the present disclosure.
FIG. 24 is a block diagram of a sound signal processing device according to an embodiment of the present disclosure.

Optionally, the receiving module 2007 is further configured to receive a second control command from the target user, where the second control command instructs to cancel the suppression of the sound of the target user. As shown in FIG. 23, the apparatus 2000 further includes: a second obtaining module 2009, configured to obtain spatial location information of the second mute space based on user information of the target user and a stored correspondence between the user information of the target user and the spatial location information of the second mute space; and an adding module 2010, configured to add the second mute space to the sound pickup space based on the spatial location information of the second mute space.

Optionally, when the first control command is the voice control command, the user information in the stored correspondence includes a voiceprint of the target user; or when the first control command is the body control command, the user information in the stored correspondence includes a facial feature of the target user.

Optionally, the plurality of microphones form a two-dimensional microphone array or a three-dimensional microphone array.

Optionally, the plurality of microphones include a linear microphone array, and the first determining module 2002 is configured to: determine an azimuth of the first sound source relative to the linear microphone array based on first sound signals received by the linear microphone array; determine a search plane based on the azimuth of the first sound source relative to the linear microphone array and spatial location information of each microphone in the linear microphone array, where the first sound source is located on the search plane, and an angle between the search plane and a straight line on which the linear microphone array is located is equal to the azimuth of the first sound source relative to the linear microphone array; and search in a search range by using an SRP-PHAT algorithm, to determine the spatial location of the first sound source, where the search range includes an intersecting plane of the search plane and the sound pickup space.

Optionally, the plurality of microphones include a first linear microphone array and a second linear microphone array, and the first determining module 2002 is configured to: determine an azimuth of the first sound source relative to the first linear microphone array based on first sound signals received by the first linear microphone array; determine a first search plane based on the azimuth of the first sound source relative to the first linear microphone array and spatial location information of each microphone in the first linear microphone array, where the first sound source is located on the first search plane, and an angle between the first search plane and a straight line on which the first linear microphone array is located is equal to the azimuth of the first sound source relative to the first linear microphone array; determine an azimuth of the first sound source relative to the second linear microphone array based on first sound signals received by the second linear microphone array; determine a second search plane based on the azimuth of the first sound source relative to the second linear microphone array and spatial location information of each microphone in the second linear microphone array, where the first sound source is located on the second search plane, and an angle between the second search plane and a straight line on which the second linear microphone array is located is equal to the azimuth of the first sound source relative to the second linear microphone array; determine a search range based on a location of an intersecting line of the first search plane and the second search plane, where the first search plane and the second search plane are not coplanar; and search in the search range by using an SRP-PHAT algorithm, to determine the spatial location of the first sound source.

For the apparatus in the foregoing embodiment, specific manners of performing operations by each module have been described in detail in the embodiment related to the method, and details are not described herein.

The following describes a hardware apparatus in embodiments of the present disclosure by using an example.

FIG. 24 is a block diagram of a sound signal processing device according to an embodiment of the present disclosure. The sound signal processing device may be a sound signal processing device or a device that has a sound signal processing function and that is connected to the sound signal processing device. The sound signal processing device may be, for example, a conference terminal. The device that has the sound signal processing function and that is connected to the sound signal processing device may be a server, or a server cluster including several servers, or a cloud computing center. As shown in FIG. 24, the sound signal processing device 2400 includes a processor 2401 and a memory 2402.

The memory 2402 is configured to store a computer program, and the computer program includes program instructions.

The processor 2401 is configured to invoke the computer program to implement the method in the foregoing method embodiment.

Optionally, the sound signal processing device 2400 further includes a communication bus 2403 and a communication interface 2404.

The processor 2401 includes one or more processing cores, and the processor 2401 executes various functional applications and performs data processing by running the computer program.

The memory 2402 may be configured to store the computer program. Optionally, the memory may store an operating system and an application program unit that is needed by at least one function. The operating system may be an operating system such as a real-time operating system (Real Time executive, RTX), LINUX, UNIX, WINDOWS, or OS X.

There may be a plurality of communication interfaces 2404, and the communication interface 2404 is configured to communicate with another storage device or network device. For example, in this embodiment of the present disclosure, the communication interface of the conference terminal may be configured to send an image or a video stream to another conference terminal. The network device may be a switch, a router, or the like.

The memory 2402 and the communication interface 2404 are separately connected to the processor 2401 through the communication bus 2403.

Optionally, the sound signal processing device 2400 further includes a plurality of microphones 2405, the plurality of microphones 2405 are deployed non-linearly, distances from the plurality of microphones 2405 to a specified location in sound pickup space are not completely the same, and the plurality of microphones 2405 are configured to collect sound signals.

An embodiment of the present disclosure further provides a computer-readable storage medium. The computer-readable storage medium stores instructions. When the instructions are executed by a processor, the method in the foregoing method embodiment is implemented.

A person of ordinary skill in the art may understand that all or some of the steps of the foregoing embodiments may be implemented by hardware or by a program instructing related hardware. The program may be stored in a computer-readable storage medium. The foregoing storage medium may be a read-only memory, a magnetic disk, an optical disc, or the like.

In embodiments of the present disclosure, the terms "first", "second", and "third" are merely used for description, but cannot be understood as an indication or implication of relative importance.

The term "and/or" in the present disclosure describes only an association relationship between associated objects and represents that three relationships may exist. For example, A and/or B may represent the following three cases: Only A exists, both A and B exist, and only B exists. In addition, the character "/" in this specification generally indicates an "or" relationship between associated objects.

The foregoing descriptions are only optional embodiments of the present disclosure, but are not intended to limit the present disclosure. Any modification, equivalent replacement, improvement, or the like made within the concept and principle of the present disclosure should fall within the protection scope of the present disclosure.

What is claimed is:

1. A sound signal processing method, performed by conference terminals, wherein the method comprises:

obtaining first spatial location information of sound pickup space and second spatial location information of a plurality of microphones, wherein the plurality of microphones are deployed non-linearly, and distances from each of the plurality of microphones to a specified location in the sound pickup space are different;

determining, based on first sound signals respectively received by the plurality of microphones and the second spatial location information, a spatial location of a first sound source that emits the first sound signals; and if the first sound source is located within the sound pickup space, processing on the sound signals emitted by the first sound source; and determining, based on second sound signals respectively received by the plurality of microphones and a spatial location of a second sound source that emits the second sound signals, wherein the second sound signal is a non-human sound signal;

determining first mute space based on the spatial location of the second sound source; and suppressing or not processing sounds being produced within the first mute space.

2. The method according to claim 1 wherein the method further comprises:

receiving a first control command from a target user, wherein the first control command instructs to suppress sound of the target user;

determining second mute space based on the first control command, wherein a sound source of the target user is located in the second mute space; and eliminating the second mute space from the sound pickup space.

3. The method according to claim 2, wherein the first control command is a voice control command, and the receiving a first control command from a target user comprises:

receiving first control instructions by using the plurality of microphones; and the determining second mute space based on the first control command comprises:

determining a spatial location of the sound source of the target user based on the first control commands respectively received by the plurality of microphones and the second spatial location information; and if the spatial location of the sound source of the target user is located in the sound pickup space, determining the second mute space based on the spatial location of the sound source of the target user.

4. The method according to claim 2, wherein the first control command is a body control command, and the receiving a first control command from a target user comprises:

receiving the first control instruction based on an image captured by a target camera, wherein the image comprises imaging of the target user, and the image is a depth image; and the determining second mute space based on the first control command comprises:

determining spatial location information of the target user based on information about a location of the imaging of the target user in the image and spatial location information of the target camera; and if the target user is located in the sound pickup space, determining the second mute space based on the spatial location information of the target user, wherein the target user is located in the second mute space.

5. The method according to claim 2, wherein the method further comprises:

receiving a second control command from the target user, wherein the second control command instructs to cancel the suppression of the sound of the target user;

obtaining spatial location information of the second mute space based on user information of the target user and a stored correspondence between the user information of the target user and the spatial location information of the second mute space; and adding the second mute space to the sound pickup space based on the spatial location information of the second mute space.

6. The method according to claim 5, wherein when the first control command is the voice control command, the user information in the stored correspondence comprises a voiceprint of the target user; or when the first control command is the body control command, the user information in the stored correspondence comprises a facial feature of the target user.

7. The method according to claim 1, wherein the plurality of microphones form a two-dimensional microphone array or a three-dimensional microphone array.

8. The method according to claim 1, wherein the plurality of microphones comprise a linear microphone array, and the determining, based on first sound signals respectively received by the plurality of microphones and the second spatial location information, a spatial location of a first sound source that emits the first sound signals comprises:

determining an azimuth of the first sound source relative to the linear microphone array based on first sound signals received by the linear microphone array;

determining a search plane based on the azimuth of the first sound source relative to the linear microphone array and spatial location information of each microphone in the linear microphone array, wherein the first sound source is located on the search plane, and an angle between the search plane and a straight line on which the linear microphone array is located is equal to the azimuth of the first sound source relative to the linear microphone array; and searching in a search range by using a steered-response power phase transform SRP-PHAT algorithm, to determine the spatial location of the first sound source, wherein the search range comprises an intersecting plane of the search plane and the sound pickup space.

9. The method according to claim 1, wherein the plurality of microphones comprise a first linear microphone array and a second linear microphone array, and the determining, based on first sound signals respectively received by the plurality of microphones and the second spatial location information, a spatial location of a first sound source that emits the first sound signals comprises:

determining an azimuth of the first sound source relative to the first linear microphone array based on first sound signals received by the first linear microphone array;

determining a first search plane based on the azimuth of the first sound source relative to the first linear microphone array and spatial location information of each microphone in the first linear microphone array, wherein the first sound source is located on the first search plane, and an angle between the first search plane and a straight line on which the first linear microphone array is located is equal to the azimuth of the first sound source relative to the first linear microphone array;

determining an azimuth of the first sound source relative to the second linear microphone array based on first sound signals received by the second linear microphone array;

determining a second search plane based on the azimuth of the first sound source relative to the second linear microphone array and spatial location information of each microphone in the second linear microphone array, wherein the first sound source is located on the second search plane, and an angle between the second search plane and a straight line on which the second linear microphone array is located is equal to the azimuth of the first sound source relative to the second linear microphone array;

determining a search range based on a location of an intersecting line of the first search plane and the second search plane, wherein the first search plane and the second search plane are not coplanar; and searching in the search range by using an SRP-PHAT algorithm, to determine the spatial location of the first sound source.

10. A sound signal processing apparatus, wherein the apparatus comprises:

a plurality of microphones;

a first sound processing circuit, configured to obtain first spatial location information of sound pickup space and second spatial location information of a plurality of microphones, wherein the plurality of microphones are deployed non-linearly, and distances from the plurality of microphones to a specified location in the sound pickup space are not completely the same;

wherein the first processing circuitry is:

configured to determine, based on first sound signals respectively received by the plurality of microphones and the second spatial location information, a spatial location of a first sound source that emits the first sound signals; and if the first sound source is located in the sound pickup space, perform enhancement processing on the sound signals emitted by the first sound source; and determine, based on second sound signals respectively received by the plurality of microphones and the second spatial location information, a spatial location of a second sound source that emits the second sound signals, wherein the second sound signal is a non-human sound signal;

if the second sound source is located in the sound pickup space, determine first mute space based on the spatial location of the second sound source, wherein the second sound source is located in the first mute space; and eliminate the first mute space from the sound pickup space.

11. The apparatus according to claim 10, wherein the apparatus further comprises:

a receiver configured to receive a first control command from a target user, wherein the first control command instructs to suppress sound of the target user; and the processing circuit is further configured to:

determine second mute space based on the first control command, wherein a sound source of the target user is located in the second mute space; and eliminate the second mute space from the sound pickup space.

12. The apparatus according to claim 11, wherein:

the first control command is a voice control command;

the receiver is configured to receive first control instructions by using the plurality of microphones; and the processing circuit is further configured to:

determine a spatial location of the sound source of the target user based on the first control commands respectively received by the plurality of microphones and the second spatial location information; and if the spatial location of the sound source of the target user is located in the sound pickup space, determine the second mute space based on the spatial location of the sound source of the target user.

13. The apparatus according to claim 11, wherein the first control command is a body control command;

the receiving module is configured to receive the first control instruction based on an image captured by a target camera, wherein the image comprises imaging of the target user, and the image is a depth image; and the processing circuit is further configured to:

determine spatial location information of the target user based on information about a location of the imaging of the target user in the image and spatial location information of the target camera; and if the target user is located in the sound pickup space, and determine the second mute space based on the spatial location information of the target user, wherein the target user is located in the second mute space.

14. The apparatus according to claim 11, wherein:

the receiver is further configured to receive a second control command from the target user, wherein the second control command instructs to cancel the suppression of the sound of the target user; and the apparatus further comprises:

the processing circuit is further configured to:

obtain spatial location information of the second mute space based on user information of the target user and a stored correspondence between the user information of the target user and the spatial location information of the second mute space; and add the second mute space to the sound pickup space based on the spatial location information of the second mute space.

15. The apparatus according to claim 14, wherein when the first control command is the voice control command, the user information in the stored correspondence comprises a voiceprint of the target user; or when the first control command is the body control command, the user information in the stored correspondence comprises a facial feature of the target user.

16. The apparatus according to claim 10, wherein the plurality of microphones are disposed to form a two-dimensional microphone array or a three-dimensional microphone array.

17. The apparatus according to claim 10, wherein the plurality of microphones are arranged in a linear array— and the first determining module is configured to:

determine an azimuth of the first sound source relative to the linear microphone array based on first sound signals received by the linear microphone array;

determine a search plane based on the azimuth of the first sound source relative to the linear microphone array and spatial location information of each microphone in the linear microphone array, wherein the first sound source is located on the search plane, and an angle between the search plane and a straight line on which the linear microphone array is located is equal to the azimuth of the first sound source relative to the linear microphone array; and search in a search range by using a steered-response power phase transform SRP-PHAT algorithm, to determine the spatial location of the first sound source, wherein the search range comprises an intersecting plane of the search plane and the sound pickup space.

18. A non-transitory computer-readable storage medium, wherein the computer-readable storage medium stores computer instructions; and when the instructions are executed by a processor, the processor performs the steps of:

obtaining first spatial location information of sound pickup space and second spatial location information of a plurality of microphones that are deployed non-linearly, and distances from each of the plurality of microphones to a specified location in the sound pickup space are different;

determining, based on first sound signals respectively received by the plurality of microphones and the second spatial location information, a spatial location of a first sound source that emits the first sound signals; and if the first sound source is located within the sound pickup space, processing on the sound signals emitted by the first sound source; and determining, based on second sound signals respectively received by the plurality of microphones and a spatial location of a second sound source that emits the second sound signals, wherein the second sound signal is a non-human sound signal;

determining first mute space based on the spatial location of the second sound source; and suppressing or not processing sounds being produced within the first mute space.

* * * * *